United States Patent
Suzuki

(10) Patent No.: US 11,006,035 B2
(45) Date of Patent: May 11, 2021

(54) IMAGING SYSTEM, IMAGING DEVICE, AND IMAGING METHOD

(71) Applicant: SONY CORPORATION, Tokyo (JP)

(72) Inventor: Hiroyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,261

(22) PCT Filed: May 10, 2018

(86) PCT No.: PCT/JP2018/018087
§ 371 (c)(1),
(2) Date: Jan. 30, 2020

(87) PCT Pub. No.: WO2019/031004
PCT Pub. Date: Feb. 14, 2019

(65) Prior Publication Data
US 2021/0092301 A1    Mar. 25, 2021

(30) Foreign Application Priority Data
Aug. 9, 2017   (JP) .............................. JP2017-154117

(51) Int. Cl.
*H04N 5/232* (2006.01)
*H04N 5/225* (2006.01)

(52) U.S. Cl.
CPC ... *H04N 5/232121* (2018.08); *H04N 5/23229* (2013.01); *H04N 5/2254* (2013.01)

(58) Field of Classification Search
CPC ......... H04N 5/232121; H04N 5/23229; H04N 5/2254
See application file for complete search history.

(56) References Cited

U.S. PATENT DOCUMENTS

2006/0199734 A1\* 9/2006 Yamashita ......... H04N 5/23216
                                                          503/227
2017/0127035 A1\* 5/2017 Kon .......................... H04N 5/64
2018/0329451 A1\* 11/2018 Handa .................... H04N 5/073

FOREIGN PATENT DOCUMENTS

JP    2004-061178 A    2/2004
JP    2007-240440 A    9/2007
(Continued)

OTHER PUBLICATIONS

International Search Report and Written Opinion of PCT Application No. PCT/JP2018/018087, dated Jul. 31, 2018, 08 pages of ISRWO.

*Primary Examiner* — Gevell V Selby
(74) *Attorney, Agent, or Firm* — Chip Law Group

(57) ABSTRACT

To provide an imaging system, an imaging device, and an imaging method capable of accurately and easily synchronizing a plurality of imaging devices while suppressing a manufacturing cost and the like of the imaging device. Provided is an imaging system including three sound devices configured to output reference sounds different from one another, and a plurality of imaging devices configured to perform imaging in synchronization with one another on the basis of the reference sounds, in which each of the sound devices includes a first capture unit configured to capture the reference sound output from another of the sound devices, and an output unit configured to output the corresponding reference sound on the basis of the capture of the reference sound from the another of the sound devices, and each of the imaging devices includes a second capture unit configured to capture each of the reference sounds, a storage unit configured to store information regarding mutual relative positions of the three sound devices, and a synchronization signal generation unit configured to correct any one of the reference sounds on the basis of an interval of capturing each of (Continued)

the reference sounds and the relative positions to generate a synchronization signal for imaging.

10 Claims, 12 Drawing Sheets

(56) References Cited

FOREIGN PATENT DOCUMENTS

| | | | |
|---|---|---|---|
| JP | 2008-507710 | A | 3/2008 |
| JP | 2013-074466 | A | 4/2013 |
| JP | 2016-085208 | A | 5/2016 |

* cited by examiner

IMAGING SYSTEM, IMAGING DEVICE, AND IMAGING METHOD

CROSS REFERENCE TO RELATED APPLICATIONS

This application is a U.S. National Phase of International Patent Application No. PCT/JP2018/018087 filed on May 10, 2018, which claims priority benefit of Japanese Patent Application No. JP 2017-154117 filed in the Japan Patent Office on Aug. 9, 2017. Each of the above-referenced applications is hereby incorporated herein by reference in its entirety.

TECHNICAL FIELD

The present disclosure relates to an imaging system, an imaging device, and an imaging method.

BACKGROUND ART

In recent years, multi-camera systems (imaging systems) capable of simultaneously imaging the same object or the same environment from different angles from a plurality of imaging devices have been widespread in sports, live music, or events. For example, a captured image of a sport scene captured by such a multi-camera system can be used for checking a form or the like. Furthermore, by capturing an event venue by such a multi-camera system, an image with a realistic feeling can be provided to the user.

In the multi-camera system, synchronization among the plurality of imaging devices is required to match the timing of imaging and the like. For example, an example of a method of performing synchronization among the plurality of imaging devices includes a method using a reference sound such as an ultrasonic wave. In this method, synchronization is performed on the basis of the reference sound. The synchronization is performed after a delay time of capture of each imaging device from the point of time of output of the reference sound is corrected, the delay time being due to propagation of the reference sound from an output device that outputs the reference sound to the imaging device that captures the reference sound. Therefore, to acquire information of such a delay time, knowing distances between the output device that outputs the reference sound and each of the imaging devices that capture the reference sound is required. An example of a technology for measuring such distances among devices includes a technology disclosed in Patent Document 1 below.

CITATION LIST

Patent Document

Patent Document 1: PCT Japanese Translation Patent Publication No. 2008-507710

SUMMARY OF THE INVENTION

Problems to be Solved by the Invention

However, in a case of applying the technology disclosed in Patent Document 1 to a multi-camera system (imaging system), the imaging device itself outputs the reference sound. Therefore, the imaging device needs to have both a functional unit that captures the reference sound and a functional unit that outputs the reference sound. Therefore, according to the technology disclosed in Patent Document 1, suppression of an increase in manufacturing cost and volume of the imaging device is difficult. Moreover, to accurately acquire information of the delay time, measurement of propagation speed (sound speed) of the reference sound that changes depending on an ambient temperature, atmospheric pressure, or the like is required. Therefore, providing a mechanism that measures the propagation speed of the reference sound in the multi-camera system is conceivable. However, as a result, the configuration of the multi-camera system becomes complicated, and the system construction cost increases and use of the system becomes not easy.

Therefore, in view of the above circumstances, the present disclosure proposes new and improved imaging system, imaging device, and imaging method capable of accurately and easily synchronizing a plurality of imaging devices while suppressing the manufacturing cost and the like of the imaging device.

Solutions to Problems

According to the present disclosure, provided is an imaging system including three sound devices configured to output reference sounds different from one another, and a plurality of imaging devices configured to perform imaging in synchronization with one another on the basis of the reference sounds, in which each of the sound devices includes a first capture unit configured to capture the reference sound output from another of the sound devices, and an output unit configured to output the corresponding reference sound on the basis of the capture of the reference sound from the another of the sound devices, and each of the imaging devices includes a second capture unit configured to capture each of the reference sounds, a storage unit configured to store information regarding mutual relative positions of the three sound devices, and a synchronization signal generation unit configured to correct any one of the reference sounds on the basis of an interval of capturing each of the reference sounds and the relative positions to generate a synchronization signal for imaging.

Furthermore, according to the present disclosure, provided is an imaging device including a capture unit configured to capture each of reference sounds output from respective three sound devices, a storage unit configured to store information regarding mutual relative positions of the three sound devices, and a synchronization signal generation unit configured to correct any one of the reference sounds on the basis of an interval of capturing each of the reference sounds and the relative positions to generate a synchronization signal for imaging.

Moreover, according to the present disclosure, provided is an imaging method performed by an imaging device, the imaging method including capturing each of reference sounds output from respective three sound devices on the basis of capture of a reference sound from another of the sound devices, and correcting any one of the reference sounds on the basis of an interval of capturing each of the reference sounds and information regarding mutual relative positions of the three sound devices to generate a synchronization signal for imaging.

Effects of the Invention

As described above, according to the present disclosure, an imaging system, an imaging device, and an imaging method capable of accurately and easily synchronizing a plurality of imaging devices while suppressing the manufacturing cost and the like of the imaging device can be provided.

Note that the above-described effect is not necessarily limited, and any of effects described in the present specification or other effects that can be grasped from the present specification may be exerted in addition to or in place of the above-described effect.

MODE FOR CARRYING OUT THE INVENTION

Figure 1:
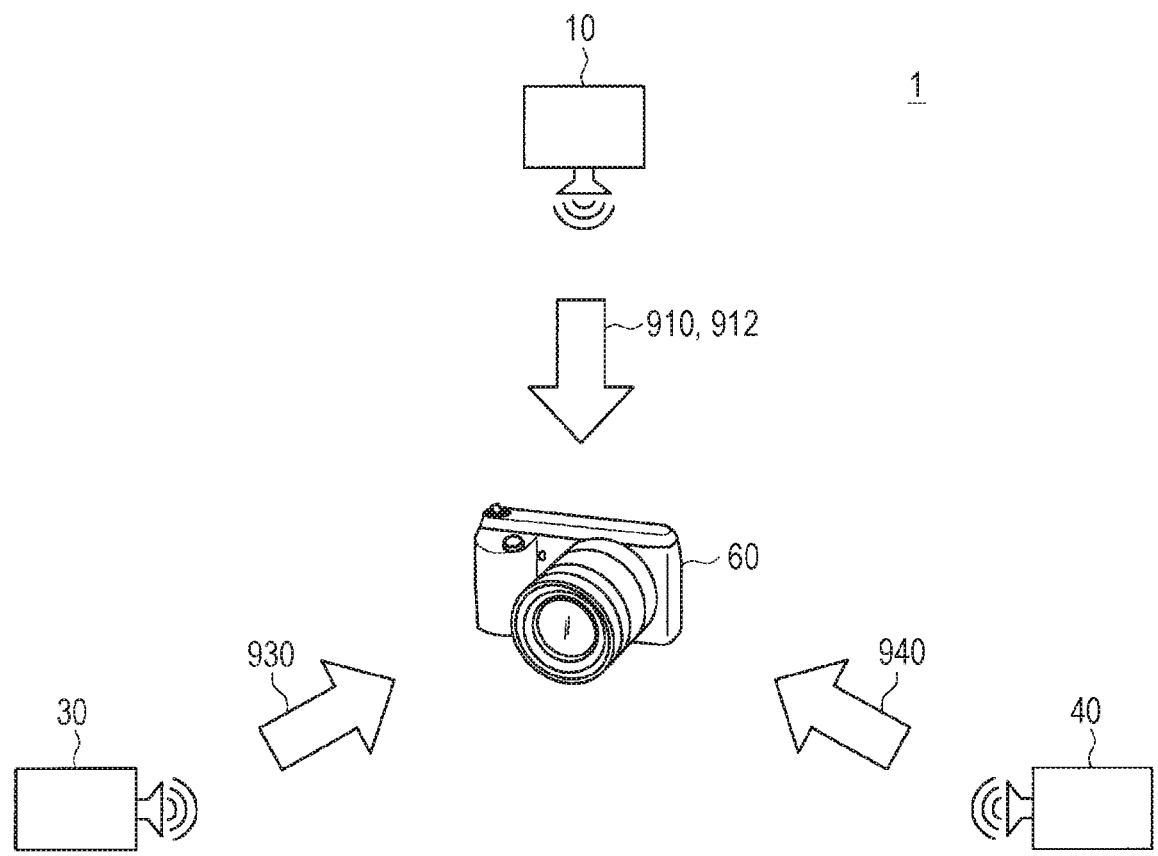
FIG. 1 is a diagram illustrating a configuration example of a multi-camera system 1 according to an embodiment of the present disclosure.

A favorable embodiment of the present disclosure will be described in detail with reference to the appended drawings. Note that, in the present specification and drawings, redundant description of configuration elements having substantially the same functional configuration is omitted by providing the same sign.

Furthermore, in the present specification and drawings, a plurality of configuration elements having substantially the same or similar functional configurations may be distinguished by being denoted with different alphabets after the same sign. Note that, in a case where there is no need to distinguish the plurality of configuration elements having substantially the same or similar functional configurations, only the same sign will be given.

Note that the description will be given in the following order.

1. Background Leading to Creation of Embodiment According to Present Disclosure by Present Inventor
2. Embodiment of Present Disclosure
2.1 Outline of Multi-Camera System 1
2.2 Detailed Configuration of Sound Device 10
2.3 Detailed Configuration of Sound Device 30
2.4 Detailed Configuration of Imaging Device 60
2.5 Basic Principle
2.6 Imaging Method
3. Conclusion
4. Modification
5. Supplement 1. Background Leading to Creation of Embodiment According to Present Disclosure by Present Inventor First, before describing an embodiment according to the present disclosure, the background leading to creation of the present embodiment by the present inventor will be described.

When performing synchronization among a plurality of devices, it is common to transmit and receive a timing signal that serves as a reference via wired communication or wireless communication. However, in the case of adopting the wired communication for ensuring the synchronization among the plurality of imaging devices in a multi-camera system (imaging system), imaging underwater by the multi-camera system is not easy. More specifically, in the case of adopting the wired communication, the plurality of imaging devices in the multi-camera system is connected by a communication cable, for example. When the plurality of imaging devices is connected to one another by the communication cable, as described above, free movement of the imaging devices is hindered, and imaging of an object freely moving underwater (for example, an object moving in a wide range underwater) by the imaging devices is difficult. Furthermore, such a situation is not limited to the underwater imaging, and a similar situation can be said to occur in imaging on land. Moreover, since the communication cable needs to be connected, provision of a waterproof mechanism (such as a waterproof housing) that protects the imaging devices from water while ensuring the connection of the communication cable is required, which contributes to an increase in the manufacturing cost of the imaging devices.

Furthermore, in the case of adopting the wireless communication (such as use of special radio communication or global positioning system (GPS)) to ensure the synchronization among the plurality of imaging devices in the multi-camera system, communication with electromagnetic waves is difficult under the special environment such as underwater, and synchronization among the plurality of imaging devices may not be able to be properly performed. Moreover, even in the case of adopting either the wired communication or the wireless communication, each imaging device is required to have both the function to transmit and the function to receive the timing signal, and thus suppression of the increase in the manufacturing cost and volume of the imaging device is difficult.

Furthermore, an example of a method of ensuring synchronization among the plurality of imaging devices includes a method using a reference sound such as an ultrasonic wave as the timing signal. Here, the reference sound used for synchronization is a sound wave, and the sound wave means vibration that propagates into surroundings by vibration of a medium (gas, liquid, or solid). Moreover, among sound waves, the ultrasonic wave refers to a sound wave having a frequency (about 20 kHz or higher) that cannot be heard by humans. Furthermore, the sound wave has different ease of transmission depending on the medium, and since the sound wave is transmitted faster in the case where the medium is a liquid (underwater) than the case where the medium is a gas (in the air), use of the sound wave is favorable when ensuring the synchronization among the imaging devices underwater.

In a case of performing synchronization on the basis of such a reference sound, a device performs the synchronization on the basis of the reference sound after a delay time of capture of each imaging device from the point of time of output of the reference sound is corrected, the delay time being due to propagation of the reference sound from an output device that outputs the reference sound to the imaging device that captures the reference sound. Therefore, to acquire information of such a delay time, knowing distances between the output device that outputs the reference sound and each of the imaging devices that capture the reference sound is required. Moreover, to accurately acquire information of the delay time, measurement of propagation speed (sound speed) of the reference sound that changes depending on an ambient temperature, atmospheric pressure, or the like is required.

Therefore, in the case of adopting the synchronization using a reference sound in the multi-camera system including the plurality of imaging devices, fixing the output device and each of the imaging devices at predetermined positions in advance is conceivable. However, in such a multi-camera system, although the distances from the output device to each of the imaging devices can be grasped and the delay time can be corrected, each of the imaging devices cannot freely move. As a result, it has been difficult for the multi-camera system to track and capture a freely moving object and provide a user with a captured image with a realistic feeling.

Furthermore, in a case of enabling each of the imaging devices in the multi-camera system to freely move, measurement of the distances from the output device to each of the imaging devices in real time is required. Moreover, to accurately acquire information of the delay time, measurement of the propagation speed (sound speed) of the reference sound that changes depending on an ambient temperature, temperature, or the like is required. Therefore, in the multi-camera system, a distance measurement system using a laser or visible light and a sound speed measurement system that measures the propagation speed of the reference sound are introduced. However, in the case of introducing such measurement systems, suppression of an increase in system construction cost for constructing the multi-camera system and a scale of the multi-camera system is difficult.

Furthermore, in the above-described case, measurement of the distances from the output device to each of the imaging devices using the reference sound is conceivable in the multi-camera system. An example of such a technology includes a technology disclosed in Patent Document 1. In Patent Document 1, a device to be measured in distance in the system captures a sound wave from an output device and outputs the sound wave on the basis of the capture, thereby measuring the distance. Therefore, in the case of applying the technology disclosed in Patent Document 1 to the multi-camera system, the respective imaging devices themselves output sound waves. Therefore, each of the imaging devices is provided with both the function to capture the sound wave and the function to output the sound wave. As a result, in the case of applying the technology disclosed in Patent Document 1, suppression of the increase in the manufacturing cost and volume of the imaging device becomes difficult. Moreover, in the above-described case, in a case where the number of imaging devices in the multi-camera system increases, types of sound waves to be output and captured increases, and discriminating from which imaging device the sound wave has been output is difficult in reality.

Therefore, in view of the foregoing, the present inventor has arrived at creation of the embodiment of the present disclosure capable of accurately and easily synchronizing a plurality of imaging devices while suppressing the increase in manufacturing cost and volume of the imaging device. Specifically, the present inventor has created the present embodiment using reference sounds in order to establish synchronization among a plurality of imaging devices. In the present embodiment, the above distances are measured and the above delay time can be corrected without introducing a distance measurement system and a sound speed measurement system. Moreover, since the imaging device according to the present embodiment has the function to capture a reference sound but does not have the function to output a reference sound, the increase in the manufacturing cost and volume of the imaging device can be avoided. Hereinafter, details of such an embodiment of the present disclosure will be described in order.

2. Embodiment of Present Disclosure

<2.1 Outline of Multi-Camera System 1>

First, an outline of a multi-camera system (imaging system) 1 according to an embodiment of the present disclosure will be described with reference to FIG. 1. FIG. 1 is a diagram illustrating a configuration example of the multi-camera system 1 according to the present embodiment. As illustrated in FIG. 1, the multi-camera system 1 according to the present embodiment includes a sound device (first sound device) 10, a sound device (second sound device) 30, a sound device (third sound device) 40, and an imaging device 60.

The sound devices 10, 30, and 40 are devices that output reference sounds 910, 912, 930, and 940, and further capture the reference sounds 910, 912, 930, and 940. Note that, in the multi-camera system 1, installation positions of these sound devices 10, 30, and 40 are assumed to be known. Specifically, it is assumed that information about a relative positional relationship (relative positions) of the sound devices 10, 30, and 40 is stored in advance in a storage unit 624 (see FIG. 4) of the imaging device 60. Moreover, in the present embodiment, configurations of the sound device 30 and the sound device 40 are common. Furthermore, the imaging device 60 is a device that images an object and can capture the reference sounds 910, 912, 930, and 940 output from the sound devices 10, 30, and 40. Moreover, the imaging device 60 is freely movable in the multi-camera system 1, in other words, a region where the each of reference sounds 910, 912, 930, and 940 output by the sound devices 10, 30, and 40 is capturable. Note that, in the following description, "capture" refers to acquiring specific sound waves, that is, the above-described reference sounds 910, 912, 930, and 940. Specifically, the capture means specifying that the above-described reference sounds 910, 912, 930, and 940 are sound waves (reference sound 910, 912, 930, and 940) output from the sound devices 10, 30, and 40 in the sound devices 10, 30, and 40, and the imaging device 60, and continuously acquiring the specified reference sounds 910, 912, 930, and 940.

Note that FIG. 1 illustrates only one imaging device 60. However, the multi-camera system 1 according to the present embodiment includes two or more imaging devices 60. Hereinafter, a detailed configuration of each device included in the multi-camera system 1 will be described.

<2.2 Detailed Configuration of Sound Device 10>

Figure 2:
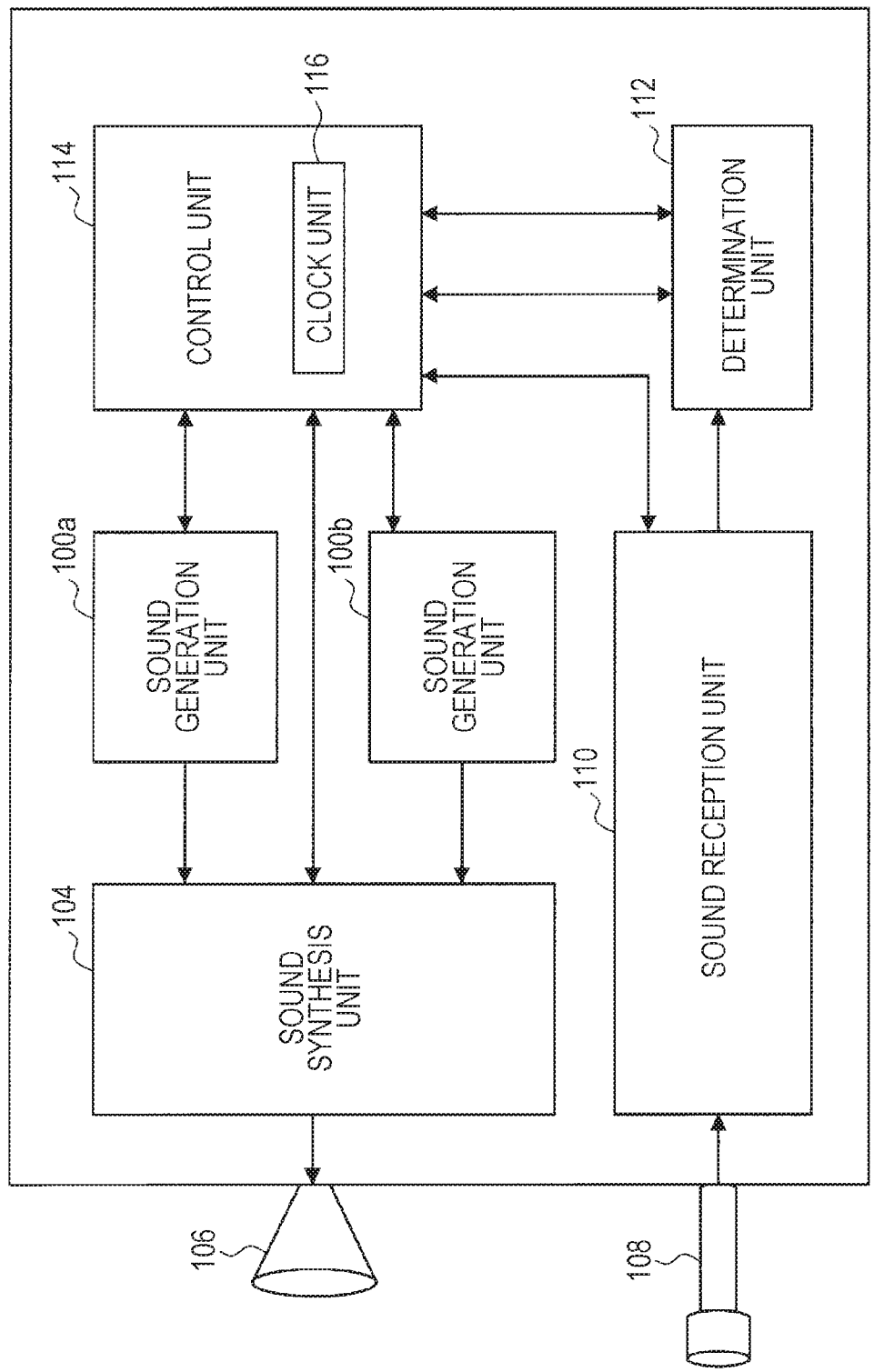
FIG. 2 is a block diagram illustrating a configuration example of a sound device 10 according to the embodiment.

First, a detailed configuration of the sound device 10 according to the present embodiment will be described with reference to FIG. 2. FIG. 2 is a block diagram illustrating a configuration example of the sound device 10 according to the present embodiment. As illustrated in FIG. 2, the sound device 10 according to the present embodiment mainly includes sound generation units 100a and 100b, a sound synthesis unit 104, a speaker (output unit) 106, a microphone 108, a sound reception unit 110, a determination unit (first capture unit) 112, and a control unit 114. Hereinafter, details of the respective functional units of the sound device 10 will be described.

(Sound Generation Units 100a and 100b)

The sound generation units 100a and 100b generate the reference sounds 910 and 912 for synchronizing the imaging device 60. Specifically, the sound generation units 100a and 100b respectively generate the pulse-shaped reference sounds 910 and 912 having different frequencies (here, a frequency refers to a frequency of a sound wave itself), modulation patterns, pulse intervals, and the like from each other and output reference sounds 910 and 912 to the sound synthesis unit 104 to be described below. Here, the reference sound 910 is a reference sound output from the sound device 10 toward the sound device 30, and the reference sound 912 is a reference sound output from the sound device 10 toward the sound device 40. Furthermore, these reference sounds 910 and 912 favorably have frequencies in an ultrasonic region in view of underwater use and influence on users. Moreover, the sound generation units 100a and 100b are mainly configured by hardware such as a central processing unit (CPU), a read only memory (ROM), and a random access memory (RAM) provided in the sound device 10.

(Sound Synthesis Unit 104)

The sound synthesis unit 104 synthesizes the reference sounds output from the speaker 106 to be described below on the basis of outputs from the sound generation units 100a and 100b. For example, the sound synthesis unit 104 is mainly configured by the hardware such as the CPU, the ROM, and the RAM provided in the sound device 10.

(Speaker 106)

The speaker 106 outputs the reference sounds 910 and 912. Specifically, the speaker 106 converts a signal from the sound synthesis unit 104 into an electrical signal, and further converts the electrical signal into a sound wave and outputs the sound wave.

(Microphone 108)

The microphone 108 collects an environmental sound around the sound device 10, converts the collected environmental sound into an electrical signal, and outputs the electrical signal to the sound reception unit 110 to be described below.

(Sound Reception Unit 110)

The sound reception unit 110 processes the electrical signal from the above-described microphone 108, converts the electrical signal into data for analyzing the frequencies of the received reference sounds 930 and 940, and outputs the data to the determination unit 112 to be described below. For example, the sound reception unit 110 is mainly configured by the hardware such as the CPU, the ROM, and the RAM provided in the sound device 10.

(Determination Unit 112)

The determination unit 112 analyzes the data output from the sound reception unit 110 and determines (specifies) from which sound devices such as the sound device 30 the sound waves included in the data are output as the reference sounds on the basis of the frequencies of the sound waves and the like, and acquires the determined reference sounds 930 and 940 together with the determination result. Information acquired by the determination unit 112 in this manner is output to the control unit 114 to be described below. For example, the determination unit 112 is mainly configured by the hardware such as the CPU, the ROM, and the RAM provided in the sound device 10.

(Control Unit 114)

The control unit 114 is provided in the sound device 10, and can control each of the functional units of the sound device 10 and can control output and capture of the reference sounds 910, 912, 930, and 940. The control unit 114 is implemented by the hardware such as the CPU, the ROM, and the RAM, for example. Note that some of the functions of the control unit 114 may be provided by a server (not illustrated) or the like in the multi-camera system 1.

Furthermore, the control unit 114 may include a clock unit 116 that serves as a temporal reference for the output and capture of the reference sounds 910, 912, 930, and 940. The clock unit 116 is implemented by, for example, an oscillator that vibrates at a constant frequency. The control unit 114 controls the sound generation units 100a and 100b that generate the reference sounds 910 and 912 and controls the determination unit 112 that determines the captured reference sounds 930 and 940 by comparing the reference sounds with a generation signal of the clock unit 116.

<2.3 Detailed Configuration of Sound Device 30>

Figure 3:
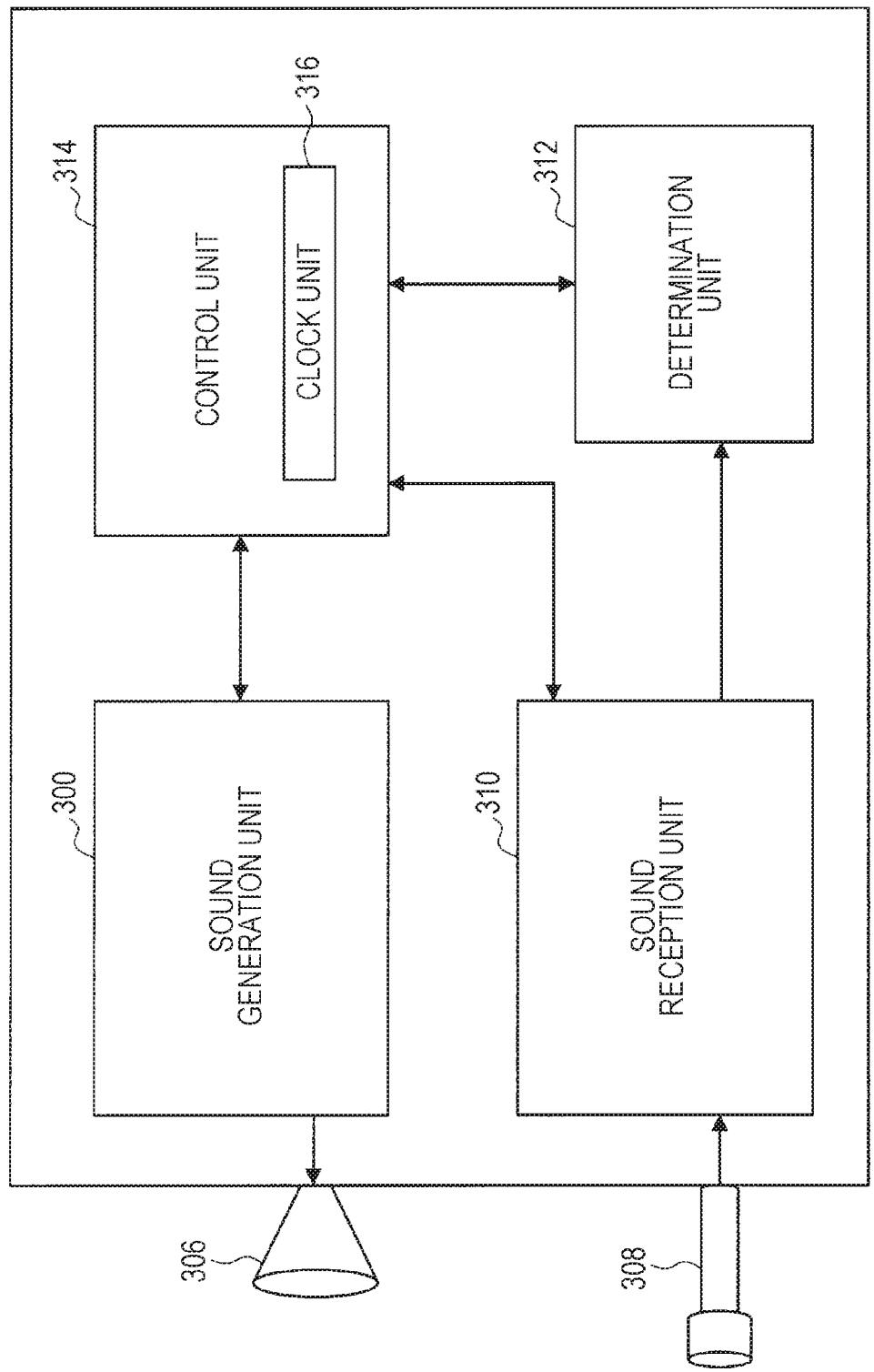
FIG. 3 is a block diagram illustrating a configuration example of a sound device 30 (40) according to the embodiment.

Next, a detailed configuration of the sound device 30 according to the present embodiment will be described with reference to FIG. 3. FIG. 3 is a block diagram illustrating a configuration example of the sound device 30 according to the present embodiment. Note that, as described above, in the present embodiment, the configuration of the sound device 30 and the configuration of the sound device 40 are common.

As illustrated in FIG. 3, the sound device 30 according to the present embodiment mainly includes a sound generation unit 300, a speaker 306, a microphone 308, a sound reception unit 310, a determination unit 312, and a control unit 314. Note that, in the sound device 30, the respective functional units are common to the above-described functional units having the same names of the sound device 10, and thus description of the respective functional units is omitted here. Note that the sound device 30 outputs one reference sound 930 (the sound device 40 outputs one reference sound 940), unlike the sound device 10. The reference sound 930 (reference sound 940) is a pulse-shaped reference sound having a frequency, a pulse interval, and the like different from the reference sounds 910, 912, and the like, and favorably has a frequency in an ultrasonic region. In other words, the reference sounds 910, 912, 930, and 940 can be discriminated because of having the different frequencies from one another.

<2.4 Detailed Configuration of Imaging Device 60>

Figure 4:
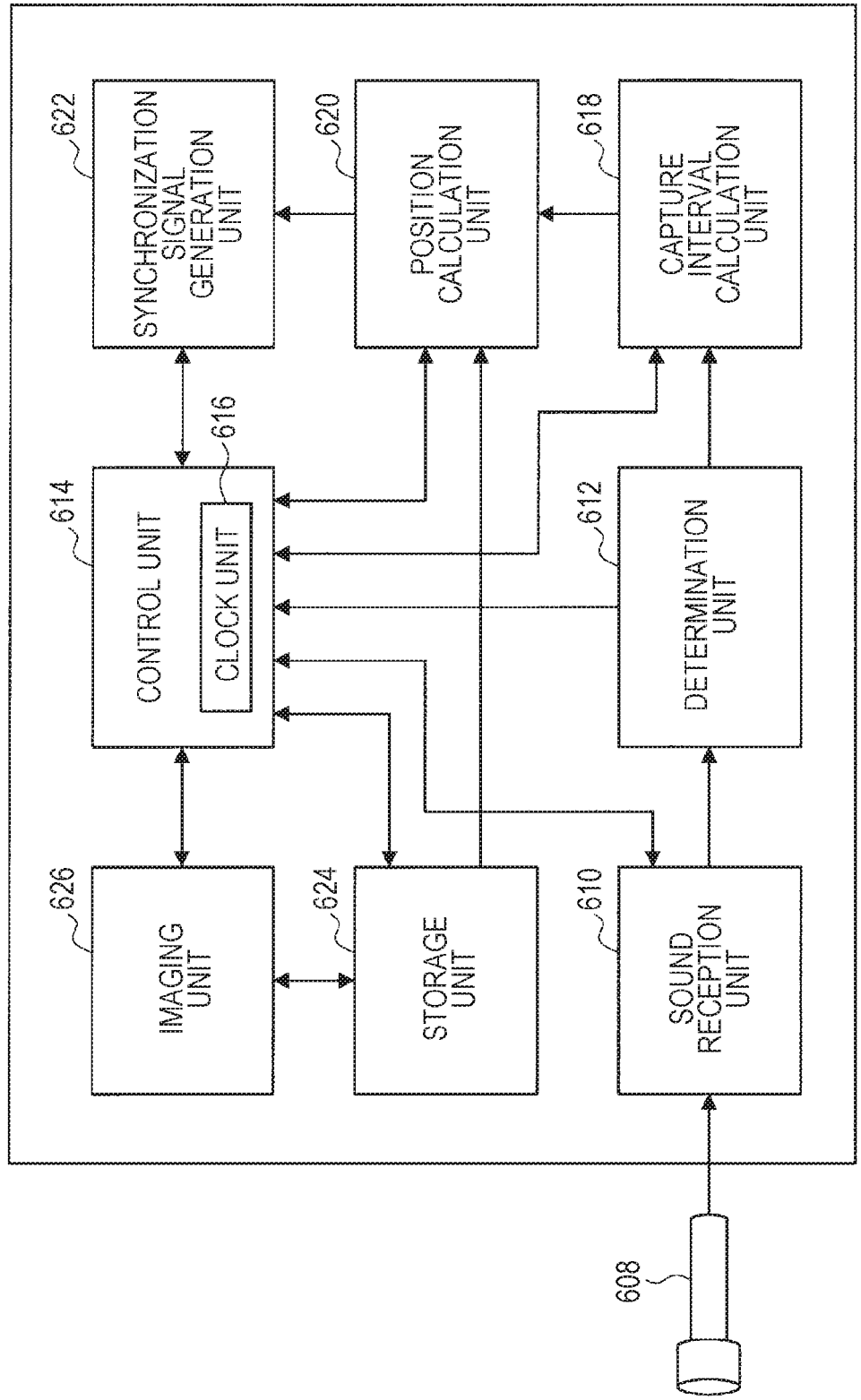
FIG. 4 is a block diagram illustrating a configuration example of an imaging device 60 according to the embodiment.

Next, a detailed configuration of the imaging device 60 according to the present embodiment will be described with reference to FIG. 4. FIG. 4 is a block diagram illustrating a configuration example of the imaging device 60 according to the present embodiment. As illustrated in FIG. 4, the imaging device 60 according to the present embodiment mainly includes a microphone 608, a sound reception unit 610, a determination unit 612, a control unit 614, a capture interval calculation unit 618, a position calculation unit 620, a synchronization signal generation unit 622, a storage unit 624, and an imaging unit 626. Note that, in the imaging device 60, the microphone 608, the sound reception unit 610, the determination unit (second capture unit) 612, and the control unit 614 are common to the functional units having the same names of the sound devices 10 and 30, and thus description of these respective functional units is omitted here. Hereinafter, details of the respective functional units of the imaging device 60, which are not common to the sound devices 10 and 30 will be described.

(Capture Interval Calculation Unit 618)

The capture interval calculation unit 618 calculates delay times at points of time when the reference sounds 910, 912, 930, and 940 have been captured with respect to points of time when the reference sounds 910, 912, 930, and 940 have been captured by the imaging device 60, and outputs the delay times to the position calculation unit 620 to be described below. For example, the capture interval calculation unit 618 is mainly configured by the hardware such as the CPU, the ROM, and the RAM provided in the imaging device 60. Note that details of the calculation of the delay times in the capture interval calculation unit 618 will be described below.

(Position Calculation Unit 620)

The position calculation unit 620 calculates a relative position (relative distance) of the imaging device 60 with respect to any one of the sound devices 10, 30, and 40, and outputs the relative position to the synchronization signal generation unit 622 to be described below. For example, the position calculation unit 620 is mainly configured by the hardware such as the CPU, the ROM, and the RAM provided in the imaging device 60. Note that details of the calculation of the position of the imaging device 60 in the position calculation unit 620 will be described below.

(Synchronization Signal Generation Unit 622)

The synchronization signal generation unit 622 generates a synchronization signal for causing the imaging unit 626 to be described below to perform imaging in synchronization on the basis of the output from the position calculation unit 620, and outputs the synchronization signal to the control unit 614. For example, the synchronization signal generation unit 622 is mainly configured by the hardware such as the CPU, the ROM, and the RAM provided in the imaging device 60.

(Storage Unit 624)

The storage unit 624 is provided in the imaging device 60, and stores a program, information, and the like for the control unit 614 to execute various types of processing and a captured image obtained by the imaging unit 626. Moreover, the storage unit 624 stores information of the relative positional relationship (relative positions) of the sound devices 10, 30, and 40 in advance. Note that the storage unit 624 is implemented by, for example, a nonvolatile memory such as a flash memory.

(Imaging Unit 626)

The imaging unit 626 includes an imaging device (not illustrated) such as a charge coupled device (CCD) or a complementary metal oxide semiconductor (CMOS) image sensor, and a signal processing circuit (not illustrated) for applying camera signal processing to a signal photoelectrically converted by the imaging device. The above-described imaging device collects incident light from an object as an optical image, and the above-described signal processing circuit photoelectrically converts the focused optical image in units of pixels, reads a signal of each pixel as an imaging signal, and processes the image, thereby acquiring the captured image. The imaging unit 626 transmits the captured image obtained by imaging to another imaging device (not illustrated) in the multi-camera system 1, transmits the captured image to a server (not illustrated), or outputs the captured image in the above-described storage unit 624. The imaging unit 626 receives the synchronization signal via the control unit 614, and performs imaging on the basis of the synchronization signal, thereby synchronously performing imaging in the multi-camera system 1. Moreover, the imaging unit 626 further includes an optical system mechanism (not illustrated) configured by an imaging lens, a diaphragm mechanism, a zoom lens, a focus lens, and the like, and a drive system mechanism (not illustrated) that controls the operation of the optical system mechanism.

<2.5 Basic Principle>

Figure 5:
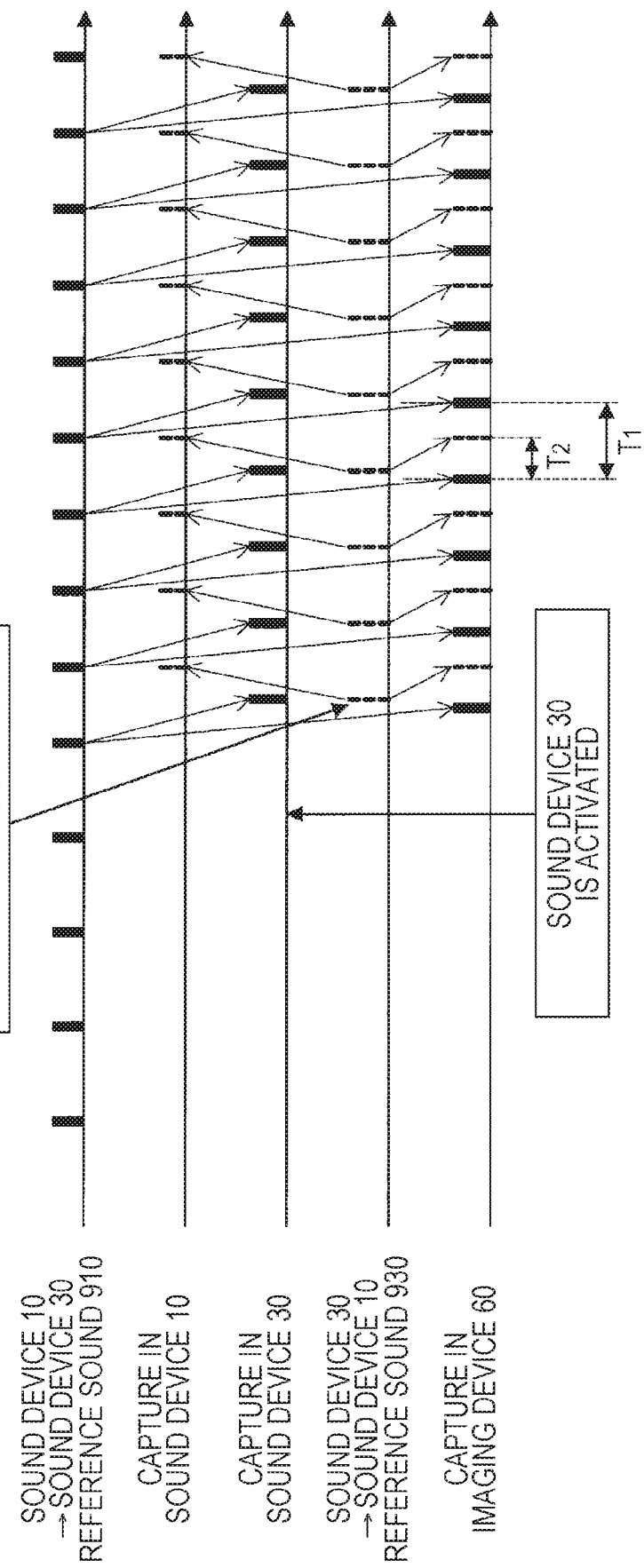
FIG. 5 is an explanatory diagram for describing output and capture of reference sounds 910 and 930 according to the embodiment.
Figure 6:
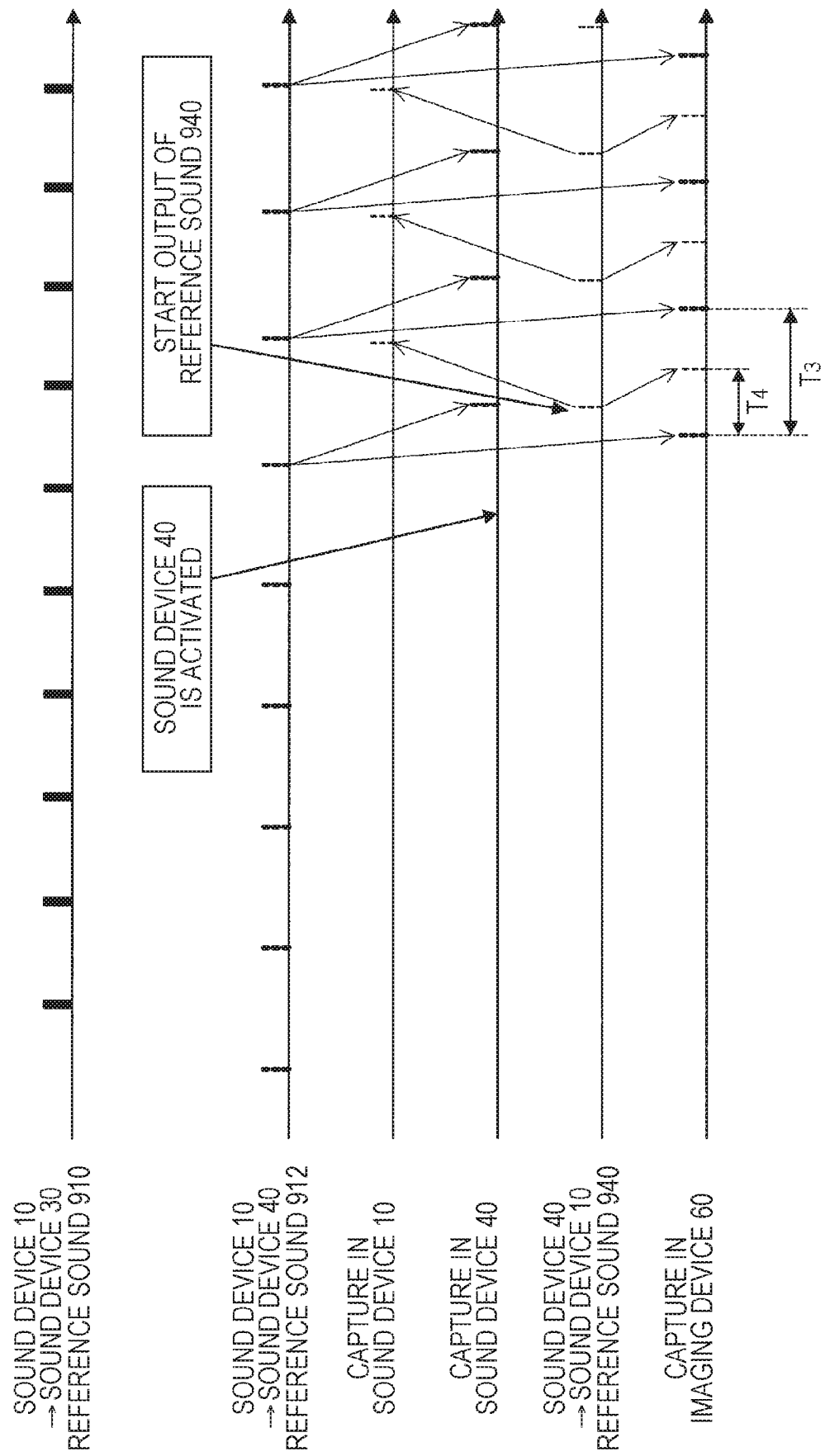
FIG. 6 is an explanatory diagram for describing output and capture of reference sounds 912 and 940 according to the embodiment.
Figure 7:
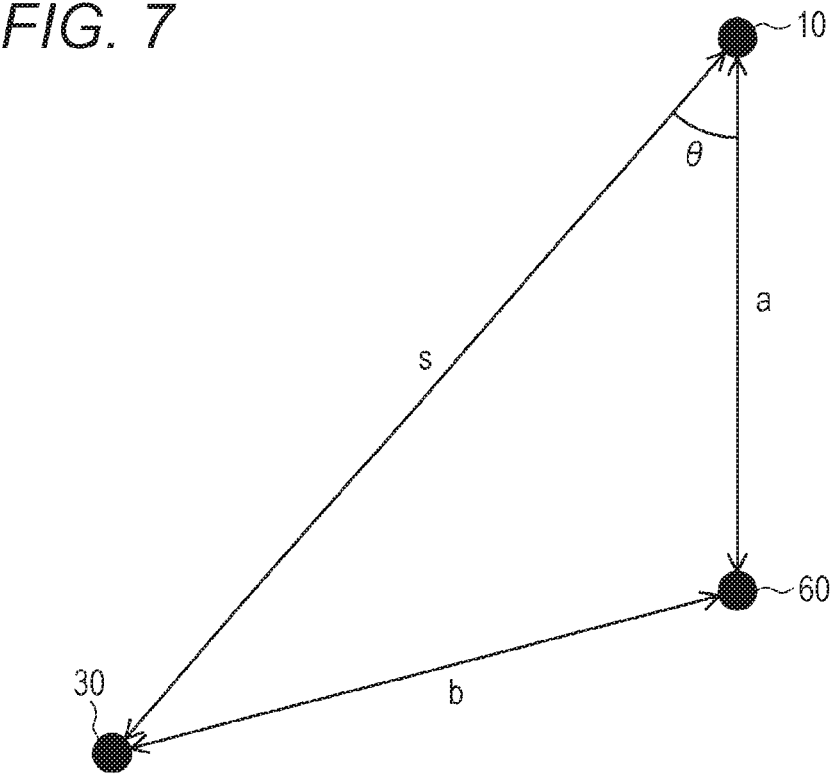
FIG. 7 is an explanatory diagram for describing a method of calculating position curves 830 and 840 according to the embodiment.
Figure 8:
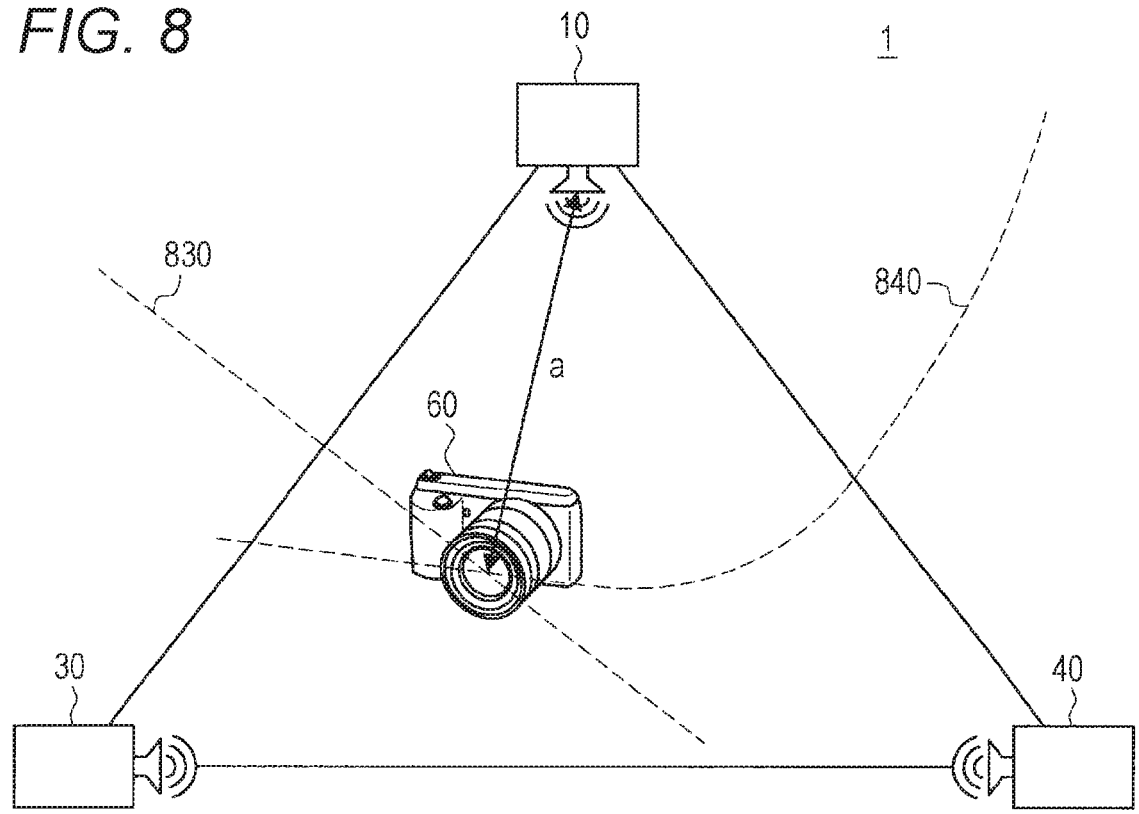
FIG. 8 is an explanatory diagram for describing a method of calculating a distance of the imaging device 60 according to the embodiment.

The detailed configurations of the sound devices 10, 30, and 40 and the imaging device 60 according to the present embodiment have been described. Next, a basic principle of an imaging method according to the present embodiment will be described with reference to FIGS. 5 to 8. FIGS. 5 and 6 are explanatory diagrams for describing output and capture of the reference sounds 910, 912, 930, and 940 according to the present embodiment. Furthermore, FIG. 7 is an explanatory diagram for describing a method of calculating position curves 830 and 840 according to the present embodiment. Moreover, FIG. 8 is an explanatory diagram for describing a method of calculating a distance of the imaging device 60 according to the present embodiment.

In the present embodiment, delay times of capture of the reference sounds 910, 912, 930, and 940 in each imaging device 60 are corrected using the reference sounds 910, 912, 930, and 940, and the synchronization signal for establishing mutual synchronization among a plurality of imaging devices 60 can be generated. Furthermore, since the imaging device 60 according to the present embodiment has the function to capture the reference sounds 910, 912, 930, and 940 but does not have the function to output the reference sounds, the increase in the manufacturing cost and volume can be avoided.

As described above, in the case of using the reference sounds for synchronization, a delay occurs in capture in each imaging device 60 with respect to the point of time of output of the reference sound due to propagation of the reference sound, synchronization is required on the basis of the reference sound after the delay time is corrected. Then, if the distance between the sound device 10 that has outputted the reference sound and the imaging device 60 that has captured the reference sound and the propagation speed (sound speed) of the reference sound at that time are not known, the delay time cannot be calculated and therefore the reference sound cannot be used as the synchronization signal. Therefore, in the present embodiment, to perform synchronization using the reference sounds 910, 912, 930, and 940, distances of the imaging device 60 from the respective sound devices 10, 30, and 40 are measured using the reference sounds 910, 912, 930, and 940. Hereinafter, a method of calculating a distance according to an embodiment of the present disclosure will be described.

First, in the present embodiment, the reference sounds 910, 912, 930, and 940 are respectively output from the three sound devices (sound devices 10, 30, and 40), information regarding a relative positional relationship (relative positions) of the sound devices 10, 30, and 40 being known, in other words, information regarding the relative positions being stored in advance in the storage unit 624 of the imaging device 60. Note that, in the present embodiment, the timing to output each of the reference sounds 910, 912, 930, and 940 is determined by capturing the mutual reference sounds 910, 912, 930, and 940 and outputting the reference sounds 910, 912, 930, and 940 to respond to the capture. For example, in the multi-camera system 1 according to the present embodiment, the pulse-shaped reference sounds 910 and 912, which serve as references, are output from the sound device 10. Moreover, the sound devices 30 and 40 respectively output the pulse-shaped reference sounds 930 and 940 on the basis of capture of the reference sounds 910 and 912 from the sound device 10. Then, the imaging device 60 captures the reference sounds 910, 912, 930, and 940 from the sound devices 10, 30, and 40.

Specifically, as illustrated in the first row from the top in FIG. 5, the sound device 10 outputs the pulse-shaped reference sound (first reference sound) 910 toward the sound device 30. Moreover, the sound device 30 immediately outputs the pulse-shaped reference sound (third reference sound) 930 as illustrated in the fourth row in FIG. 5 on the basis of capture of the reference sound 910 as illustrated in the third row in FIG. 5. At this time, the reference sound 910 and the reference sound 930 have different frequencies and the like from each other. Moreover, the sound device 10 immediately outputs the pulse-shaped reference sound 910 as illustrated in the first row in FIG. 5 on the basis of capture of the reference sound 930 as illustrated in the second row in FIG. 5. Such responses are repeated in the sound devices 10 and 30, so that the reference sounds 910 and 930 are output with a fixed period, as illustrated in the first and fourth rows in FIG. 5.

At this time, the reference sounds 910 and 930 output from the sound devices 10 and 30 with the fixed period are also captured by the imaging device 60, as illustrated in the fifth row in FIG. 5. The imaging device 60 can measure capture intervals $T_1$ and $T_2$ of the reference sounds 910 and 930 in the imaging device 60.

Specifically, as can be seen from FIG. 5, the capture interval $T_1$ from capture of the reference sound 910 to capture of the reference sound 910 again can be considered as follows. Specifically, the capture interval $T_1$ corresponds to a sum of a time obtained by subtracting a propagation time $T_{(10\to60)}$ of the reference sound 910 from the sound device 10 to the imaging device 60 from a propagation time $T_{(10\to30)}$ of the reference sound 910 from the sound device 10 to the sound device 30, a propagation time $T_{(30\to10)}$ of the reference sound 930 from the sound device 30 to the sound device 10, and a propagation time $T_{(10\to60)}$ of the reference sound 910 from the sound device 10 to the imaging device 60. Moreover, since the distance between the sound device 10 and the sound device 30 is fixed, the propagation time $T_{(10\to30)}$ and the propagation time $T_{(30\to10)}$ can be considered to be equal. Therefore, it is found that $T_1$ corresponds to twice the propagation time $T_{(10\to30)}$ according to the following mathematical expression (1).
[Math. 1]

$$T_1 = T_{(10\to30)} - T_{(10\to60)} + T_{(30\to10)} + T_{(10\to60)} = 2 * T_{(10\to30)} \quad (1)$$

Furthermore, as can be seen from FIG. 5, the capture interval $T_2$ from capture of the reference sound 910 to capture of the reference sound 930 again can be considered as follows. Specifically, the capture interval $T_2$ corresponds to a sum of a time obtained by subtracting the propagation time $T_{(10\to60)}$ of the reference sound 910 from the sound device 10 to the imaging device 60 from the propagation time $T_{(10\to30)}$ of the reference sound 910 from the sound device 10 to the sound device 30, and a propagation time $T_{(30\to60)}$ of the reference sound 930 from the sound device 30 to the imaging device 60. This is expressed by the following mathematical expression (2).
[Math. 2]

$$T_2 = T_{(10\to30)} - T_{(10\to60)} + T_{(30\to60)} \quad (2)$$

Moreover, a similar operation is performed for the sound device 40. Specifically, as illustrated in the second row from the top in FIG. 6, the sound device 10 outputs the pulse-shaped reference sound (second reference sound) 912 toward the sound device 40. At this time, the reference sound 910 and the reference sound 912 have different frequencies and the like from each other. Moreover, outputs of the reference sound 910 and the reference sound 912 may be synchronized or may not be synchronized, as illustrated in FIG. 6. Moreover, the sound device 40 immediately outputs the pulse-shaped reference sound (fourth reference sound) 940 as illustrated in the fifth row in FIG. 6 on the basis of capture of the reference sound 912 as illustrated in the fourth row in FIG. 6. Moreover, the sound device 10 immediately outputs the pulse-shaped reference sound 912 as illustrated in the second row in FIG. 6 on the basis of capture of the reference sound 940 as illustrated in the third row in FIG. 6. Such responses are repeated in the sound devices 10 and 40, so that the reference sounds 912 and 940 are output with a fixed period, as illustrated in the second and fifth rows in FIG. 6.

At this time, the reference sounds 912 and 940 output from the sound devices 10 and 40 with the fixed period are also captured by the imaging device 60, as illustrated in the sixth row in FIG. 6. Therefore, the imaging device 60 can measure capture intervals $T_3$ and $T_4$ of the reference sounds 912 and 940 in the imaging device 60.

Specifically, as can be seen from FIG. 6, the capture interval $T_3$ from capture of the reference sound 912 to capture of the reference sound 912 again can be considered as follows. Specifically, the capture interval $T_3$ corresponds to a sum of a time obtained by subtracting the propagation time $T_{(10\to60)}$ of the reference sound 910 from the sound device 10 to the imaging device 60 from a propagation time $T_{(10\to40)}$ of the reference sound 912 from the sound device 10 to the sound device 40, a propagation time $T_{(40\to10)}$ of the reference sound 940 from the sound device 40 to the sound device 10, and a propagation time $T_{(10\to60)}$ of the reference sound 912 from the sound device 10 to the imaging device 60. Moreover, since the distance between the sound device 10 and the sound device 40 is fixed, the propagation time $T_{(10\to40)}$ and the propagation time $T_{(40\to10)}$ can be considered to be equal. Therefore, it is found that $T_3$ corresponds to twice the propagation time $T_{(10\to40)}$ according to the following mathematical expression (3).
[Math. 3]

$$T_3 = T_{(10\to40)} - T_{(10\to60)} + T_{(40\to10)} + T_{(10\to60)} = 2 * T_{(10\to40)} \quad (3)$$

Furthermore, as can be seen from FIG. 6, the capture interval $T_4$ from capture of the reference sound 912 to capture of the reference sound 940 can be considered as follows. Specifically, the capture interval $T_4$ corresponds to a sum of a time obtained by subtracting a propagation time $T_{(10\to60)}$ of the reference sound 912 from the sound device 10 to the imaging device 60 from a propagation time $T_{(10\to40)}$ of the reference sound 912 from the sound device 10 to the sound device 40, and a propagation time $T_{(40\to60)}$ of the reference sound 940 from the sound device 40 to the imaging device 60. This is expressed by the following mathematical expression (4).
[Math. 4]

$$T_4 = T_{(10\to40)} - T_{(10\to60)} + T_{(40\to60)} \quad (4)$$

Furthermore, according to the mathematical expression (1), half of the time $T_1$ corresponds to the delay time $T_1'$ due to the propagation of the reference sound 910 from the sound device 10 to the sound device 30. This is expressed by the following mathematical expression (5).
[Math. 5]

$$T_1' = \frac{1}{2} * T_1 \qquad (5)$$
$$= T_{(10 \to 30)}$$

Furthermore, by subtracting the above $T_1'$ from the above $T_2$, a difference $T_2'$ between the delay time due to the propagation of the reference sound 930 from the sound device 30 to the imaging device 60 and the delay time due to the propagation of the reference sound 910 from the sound device 10 to the imaging device 60 can be obtained. This is expressed by the following mathematical expression (6).
[Math. 6]

$$\begin{aligned} T_2' &= T_2 - T_1' \qquad (6) \\ &= T_2 - \frac{1}{2} * T_1 \\ &= T_{(10 \to 30)} - T_{(10 \to 60)} + T_{(30 \to 60)} - T_{(10 \to 30)} \\ &= T_{(30 \to 60)} - T_{(10 \to 60)} \end{aligned}$$

Next, a position curve (straight line) 830 where the imaging device 60 will exist is calculated using the above-described mathematical expressions (5) and (6). FIG. 7 schematically illustrates positions of the sound devices 10 and 30 and the imaging device 60 on a plane. In FIG. 7, the distance between the sound device 10 and the sound device 30 is s, the distance between the sound device 10 and the imaging device 60 is a, and the distance between the sound device 30 and the imaging device 60 is b. Moreover, an angle made by a line segment connecting the sound device 10 and the sound device 30 and a line segment connecting the sound device 10 and the imaging device 60 across the sound device 10 is θ. Note that the distance s between the sound device 10 and the sound device 30 is known. Moreover, the following relational expression (7) is established where the propagation speed (sound speed) of the reference sounds 910 and 930 is V.
[Math. 7]

$$V = s/T_1' \qquad (7)$$

First, a case in which the distance between the sound device 10 and the imaging device 60 is shorter than the distance between the sound device 30 and the imaging device 60 (T2'>0) will be described. In this case, the following relational expression (8) is established. Moreover, the relationship of the mathematical expression (9) is established using the cosine theorem. Then, since s, $T_1'$, and $T_2'$ are known, the imaging device 60 exists on the position curve 830 represented by the mathematical expression (9) including variables a and G.
[Math. 8]

$$T_2' = \frac{b - a}{V} \qquad (8)$$

$$b^2 = a^2 - 2as \cos \theta \qquad (9)$$

Next, a case in which the distance between the sound device 10 and the imaging device 60 is longer than the distance between the sound device 30 and the imaging device 60 (T2'<0) will be described. In this case, the following relational expression (10) is established, similarly to the above. Moreover, even in this case, the relationship of the expression (11) is established using the cosine theorem. Then, since s, $T_1'$, and $T_2'$ are known, the imaging device 60 exists on the curve 830 represented by the mathematical expression (11) including the variables a and θ.
[Math. 9]

$$T_2' = \frac{a - b}{V} \qquad (10)$$

$$b^2 = a^2 + s^2 - 2as \cos \theta \qquad (11)$$

Moreover, a case in which the distance between the sound device 10 and the imaging device 60 is the same as the distance between the sound device 30 and the imaging device 60 ($T_2'$=0) will be described. In this case, the imaging device 60 exists on a normal line passing through a midpoint of the line segment connecting the sound device 10 and the sound device 30.

The curve where the imaging device 60 will exist or the normal line obtained in this way is illustrated as the position curve (normal line) 830 in FIG. 8, for example. That is, FIG. 8 illustrates the position curve (normal line) 830 in the case where the distance between the sound device 10 and the imaging device 60 is the same as the distance between the sound device 30 and the imaging device 60.

Moreover, a similar operation is performed for the sound device 40. First, according to the mathematical expression (3), half of the time 13 corresponds to the delay time $T_3'$ due to the propagation of the reference sound 912 from the sound device 10 to the sound device 40. This is expressed by the following mathematical expression (12).
[Math. 10]

$$T_3' = \frac{1}{2} * T_3 \qquad (12)$$
$$= T_{(10 \to 40)}$$

Furthermore, by subtracting the above $T_3'$ from the above $T_4$, a difference $T_4'$ between the delay time due to the propagation of the reference sound 940 from the sound device 40 to the imaging device 60 and the delay time due to the propagation of the reference sound 912 from the sound device 10 to the imaging device 60 can be obtained. This is expressed by the following mathematical expression (13).
[Math. 11]

$$\begin{aligned} T_4' &= T_4 - T_3' \qquad (13) \\ &= T_4 - \frac{1}{2} * T_3 \\ &= T_{(10 \to 40)} - T_{(10 \to 60)} + T_{(40 \to 60)} - T_{(10 \to 40)} \\ &= T_{(40 \to 60)} - T_{(10 \to 60)} \end{aligned}$$

Next, a position curve (straight line) 840 where the imaging device 60 will exist is calculated using the above-described mathematical expressions (12) and (13). In the following description, the distance between the sound device 10 and the sound device 40 is t, the distance between the sound device 10 and the imaging device 60 is a, and the distance between the sound device 40 and the imaging device 60 is c. Moreover, an angle made by a line segment connecting the sound device 10 and the sound device 40 and a line segment connecting the sound device 10 and the imaging device 60 across the sound device 10 is γ. Note that the distance t between the sound device 10 and the sound device 40 is known. Moreover, the following relational expression (14) is established where the propagation speed (sound speed) of the reference sounds 912 and 940 is V.
[Math. 12]

$$V = t/T_3' \quad (14)$$

First, a case in which the distance between the sound device 10 and the imaging device 60 is shorter than the distance between the sound device 40 and the imaging device 60 ($T_4'>0$) will be described. In this case, the following relational expression (15) is established. Moreover, the relationship of the mathematical expression (16) is established using the cosine theorem. Then, since t, $T_3'$, and $T_4'$ are known, the imaging device 60 exists on the position curve 840 represented by the mathematical expression (16) including the variables a and γ.
[Math. 13]

$$T_4' = \frac{c-a}{V} \quad (15)$$

$$c^2 = a^2 + t^2 - 2at \cos \gamma \quad (16)$$

Next, a case in which the distance between the sound device 10 and the imaging device 60 is longer than the distance between the sound device 40 and the imaging device 60 ($T_4'<0$) will be described. In this case, the following relational expression (17) is established. Moreover, the relationship of the mathematical expression (18) is established using the cosine theorem. Then, since t, $T_3'$, and $T_4'$ are known, the imaging device 60 exists on the curve 840 represented by the mathematical expression (18) including the variables a and γ.
[Math. 14]

$$T_4' = \frac{a-c}{V} \quad (17)$$

$$c^2 = a^2 + t^2 - 2at \cos \gamma \quad (18)$$

Moreover, a case in which the distance between the sound device 10 and the imaging device 60 is the same as the distance between the sound device 40 and the imaging device 60 ($T_4'=0$) will be described. In this case, the imaging device 60 exists on the normal line 840 passing through a midpoint of the line segment connecting the sound device 10 and the sound device 40.

The curve where the imaging device 60 will exist or the normal line obtained in this way is illustrated as the position curve 840 in FIG. 8, for example. Note that, in the case where the distance between the sound device 10 and the imaging device 60 is the same as the distance between the sound device 40 and the imaging device 60, the position curve 840 is illustrated as a straight line (normal line) 840.

Moreover, the imaging device 60 is present on a position where the position normal line 830 and the position curve 840 intersect in FIG. 8, and therefore the distance a between the imaging device 60 and the sound device 10 is known.

Then, since the distance a between the imaging device 60 and the sound device 10 is known, the delay time $T_5$ of capture due to the propagation of the reference sounds 910 and 912 from the sound device 10 to the imaging device 60 is known by the following mathematical expression (19) by using the propagation speed (sound speed) V of the expression (7). Therefore, according to the present embodiment, the reference sound 910 is corrected by the amount of the calculated delay time $T_5$, so that the synchronization signal for causing the imaging device 60 to synchronously performing imaging can be obtained.
[Math. 15]

$$T_5 = \frac{a}{V} \quad (19)$$

$$= \frac{a}{\left(\frac{s}{T_1'}\right)}$$

$$= \frac{a}{\left[\frac{s}{\left(\frac{1}{2} * T_1\right)}\right]}$$

As described above, the information regarding the mutual relative positional relationship (relative positions) of the three sound devices 10, 30, and 40 is stored in advance in the storage unit 624 of the imaging device 60. Therefore, according to the present embodiment, the distance a (relative distance) of the imaging device 60 with respect to the sound device 10 in the multi-camera system 1 can be obtained using the reference sounds 910, 912, 930, and 940 output from such three sound devices 10, 30, and 40. Moreover, according to the present embodiment, the delay time $T_5$ of capture due to the propagation of the reference sounds 910 and 912 from the sound device 10 to the imaging device 60 can be obtained from the distance a of the imaging device 60. Therefore, since the correction can be performed using the thus calculated delay time $T_5$ of capture, the reference sound 910 can be used as the synchronization signal.

By the way, the propagation speed (sound speed) of the reference sound is affected by the temperature, wind speed, and wind direction in a case where the medium is a gas, that is, in the air, and is affected by the water temperature, flow speed, and flow direction underwater and changes every moment. However, in the present embodiment, the propagation speed (sound speed) of the reference sound 910 at the point of time when the reference sound 910 has been captured can be obtained in real time by the expression (7) and the like, and thus it is not necessary to separately measure the propagation speed.

In the above present embodiment, in the case where the imaging device 60 is present in the space where the reference sounds 910, 912, 930, and 940 output from the sound devices 10, 30, and 40 according to the multi-camera system 1 can be reliably captured, synchronization for imaging can be established in real time even in a case where the imaging device 60 freely moves. Furthermore, according to the present embodiment, the imaging device 60 has the function to capture the reference sounds but does not have the function to output the reference sounds. Therefore, increase in the manufacturing cost and volume of the imaging device 60 can be avoided.

<2.6 Imaging Method>

Figure 9:
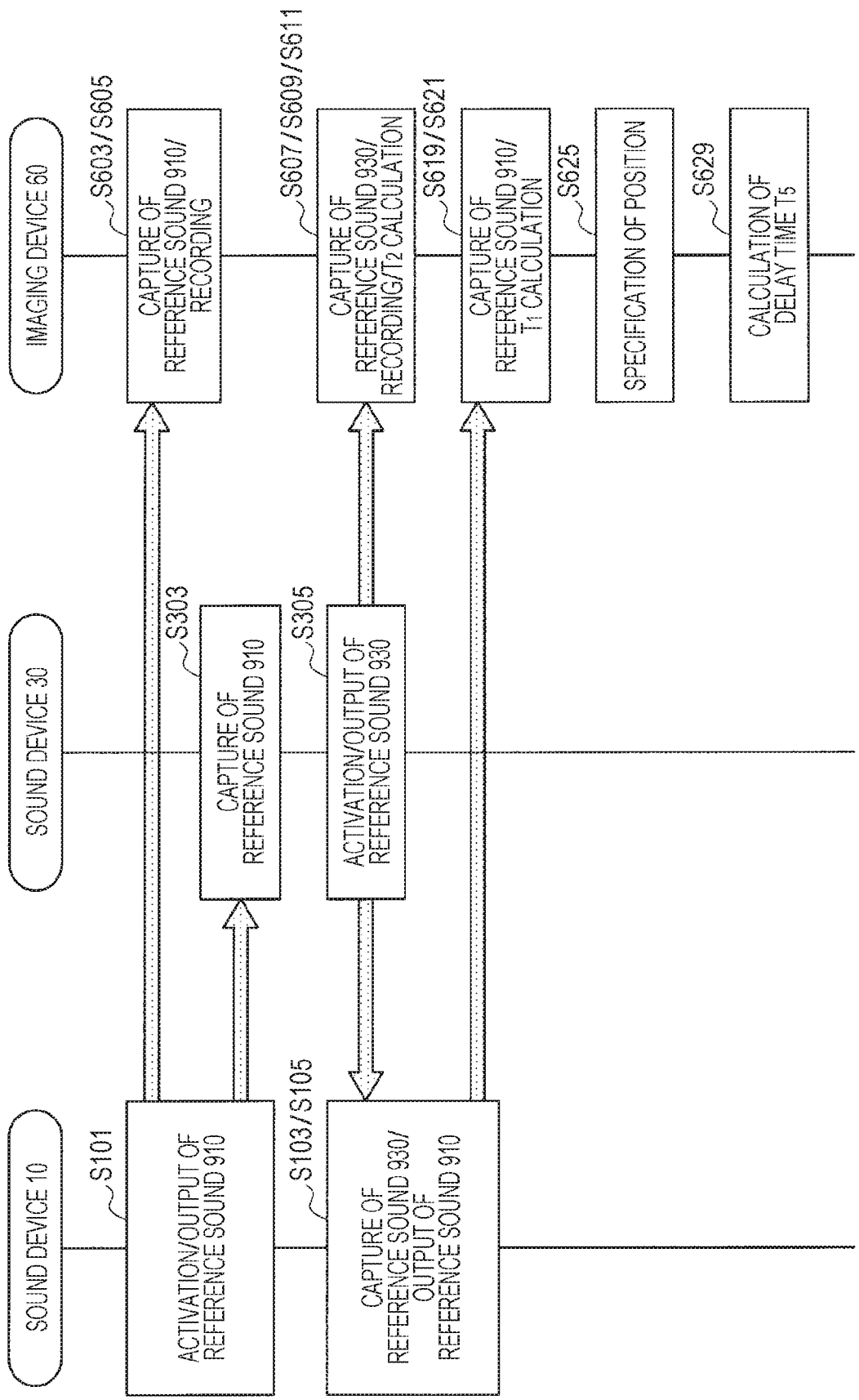
FIG. 9 is a sequence diagram of an imaging method according to the embodiment.

The basic principle of the present embodiment has been described. Next, details of the imaging method according to the present embodiment will be described with reference to FIGS. 9 to 13. FIG. 9 is a sequence diagram of the imaging method according to the present embodiment. FIGS. 10 to 13 are flowcharts of the sound devices 10, 30, and 40 and the imaging device 60 in the imaging method according to the present embodiment.

(Multi-camera System 1)

An outline of the imaging method of the multi-camera system 1 according to the present embodiment will be described with reference to FIG. 9. FIG. 9 illustrates flows of operations of the sound devices 10 and 30 and the imaging device 60. In FIG. 9, for the sake of clarity, illustration of the operation of the sound device 40 is omitted because the operation is similar to that of the sound device 30. Furthermore, in FIG. 9, for the sake of clarity, illustration of part of steps performed by the sound devices 10 and 30 and the imaging device 60 is omitted.

As illustrated in FIG. 9, in the present embodiment, first, the sound device 10 is activated and outputs the reference sound 910 (step S101). Moreover, the output reference sound 910 is captured by the sound device 30 (step S303), and the sound device 30 outputs the reference sound 930 at the captured timing (step S305). Then, the output reference sound 930 is captured by the sound device 10, and the sound device 10 outputs the reference sound 910 at the captured timing (step S103/step S105). Moreover, the imaging device 60 captures the reference sound 910 and records the capture time (step S603/step S605), and additionally captures the reference sound 930, records the capture time, and calculates the capture interval $T_2$ (step S607/step S609/step S611). Then, the imaging device 60 captures the reference sound 910 again output from the sound device 10 again and calculates the capture interval $T_1$ (step S619/step S621). Moreover, the imaging device 60 calculates the position curves 830 and 840, specifies its own position (specifically, the relative distance of the imaging device 60 with respect to the sound device 10) (step S625), and calculates the delay time 15 on the basis of the specified result (step S629).

In other words, in the present embodiment, the sound devices 10, 30, and 40 output the reference sound 910 and the like, and output the each reference sound 930 and the like as responses to the capture of the reference sound 910 and the like. Moreover, the imaging device 60 captures the reference sound 910 and the like output from the each sound device 10 and the like and calculates the interval of captured times, thereby acquiring its own position. Hereinafter, details of the operations in the respective sound devices 10, 30, and 40 and the imaging device 60 will be respectively described.

(Sound device 10)

Figure 10:
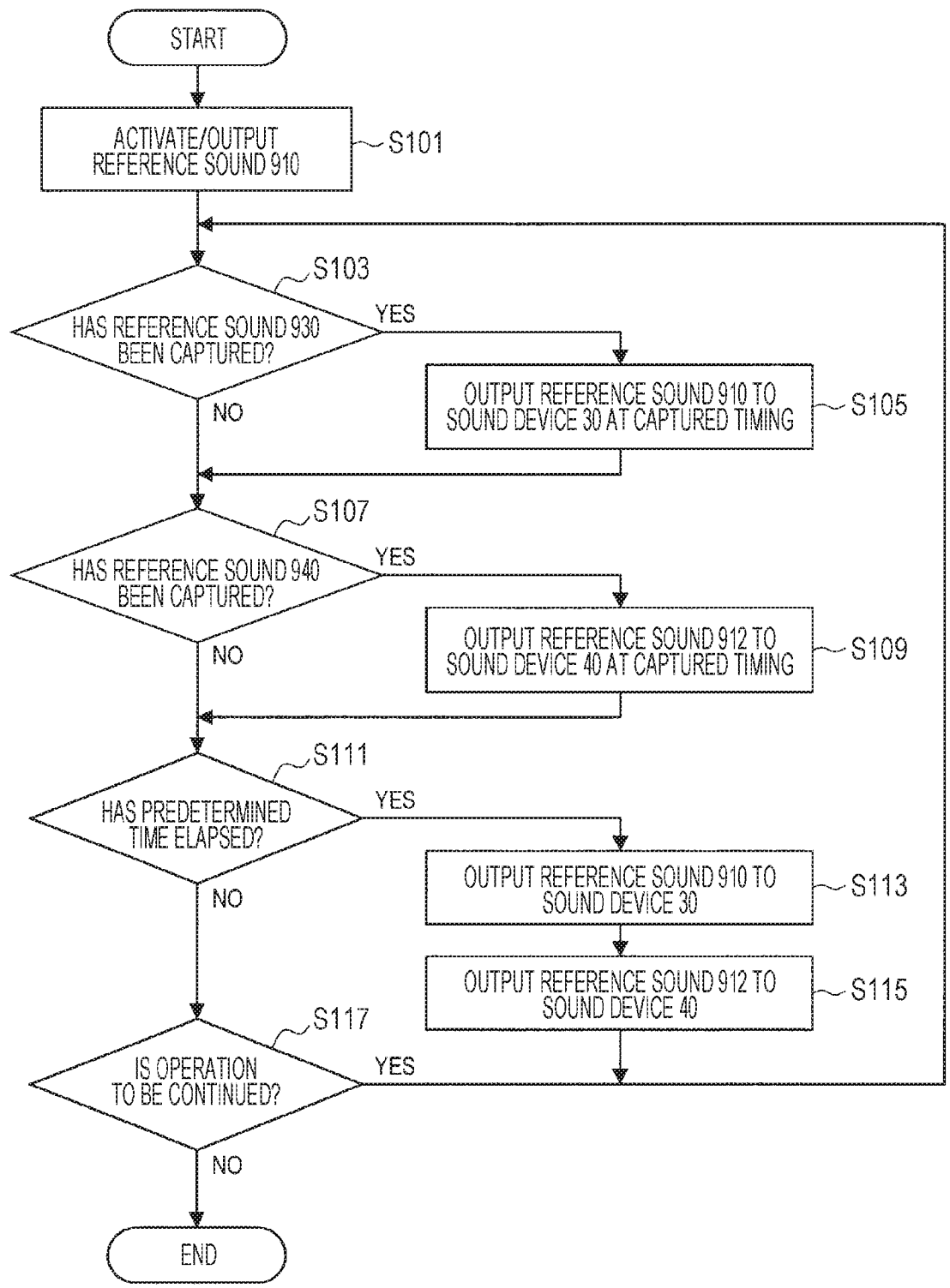
FIG. 10 is a flowchart of the sound device 10 in the imaging method according to the embodiment.

First, details of the operation of the sound device 10 will be described with reference to FIG. 10. As illustrated in FIG. 10, processing of the imaging method in the sound device 10 according to the present embodiment includes a plurality of steps from step S101 to step S117. Hereinafter, each step will be described.

—Step S101—

The sound device 10 is activated by the user and outputs the reference sounds 910 and 912.

—Step S103—

The sound device 10 proceeds to step S105 in a case where the sound device 10 has captured the reference sound 930 from the sound device 30, and proceeds to step S107 in a case where the sound device 10 has not captured the reference sound 930.

—Step S105—

The sound device 10 captures the reference sound 930 and outputs the reference sound 910 toward the sound device 30 as a response at the captured timing.

—Step S107—

The sound device 10 proceeds to step S109 in a case where the sound device 10 has captured the reference sound 940 from the sound device 40, and proceeds to step S111 in a case where the sound device 10 has not captured the reference sound 940.

—Step S109—

The sound device 10 captures the reference sound 940 and outputs the reference sound 912 toward the sound device 40 as a response at the captured timing.

Step S111

The sound device 10 proceeds to step S113 in a case where a predetermined time determined for each of the reference sounds 910 and 912 has elapsed from the point of time when the reference sounds 910 and 912 have been output, and proceeds to step S117 in a case where the predetermined time has not elapsed.

Step S113

The sound device 10 outputs the reference sound 910 toward the sound device 30 at the point of time when the predetermined time determined for the reference sound 910 has elapsed from the point of time when the reference sound 910 has been output.

Step S115 The sound device 10 outputs the reference sound 912 toward the sound device 40 at the point of time when the predetermined time determined for the reference sound 912 has elapsed from the point of time when the reference sound 912 has been output.

—Step S117—

The sound device 10 returns to step S103 above and repeats the above-described flow in a case where continuation of the operation is given in instruction by the user, and the sound device 10 terminates the operation in a case where the continuation of the operation is not given in instruction by the user.

(Sound Device 30)

Figure 11:
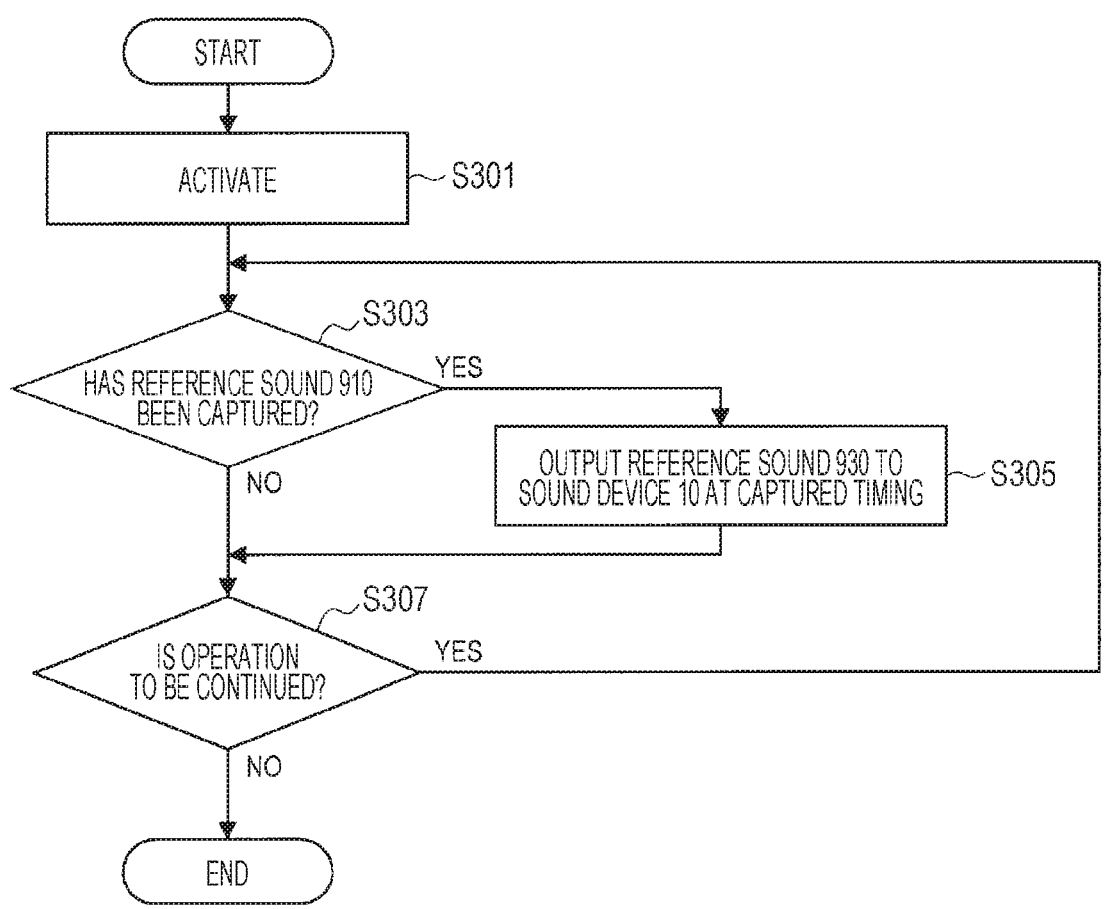
FIG. 11 is a flowchart of the sound devices 30 and 40 in the imaging method according to the embodiment.

Next, details of the operation of the sound device 30 will be described with reference to FIG. 11. As illustrated in FIG. 11, processing of the imaging method in the sound device 30 according to the present embodiment includes a plurality of steps from step S301 to step S307. Note that step S301 in FIG. 11 corresponds to step S101 in FIG. 10, step S303 in FIG. 11 corresponds to step S103 in FIG. 10, step S305 in FIG. 11 corresponds to step S105 in FIG. 10, and step S307 in FIG. 11 corresponds to step S119 in FIG. 10. Therefore, description of details of these steps is omitted here. Moreover, since the sound device 40 performs a similar operation to the sound device 30, description of details of the operation of the sound device 40 is omitted here.

(Imaging device 60)

Figure 12:
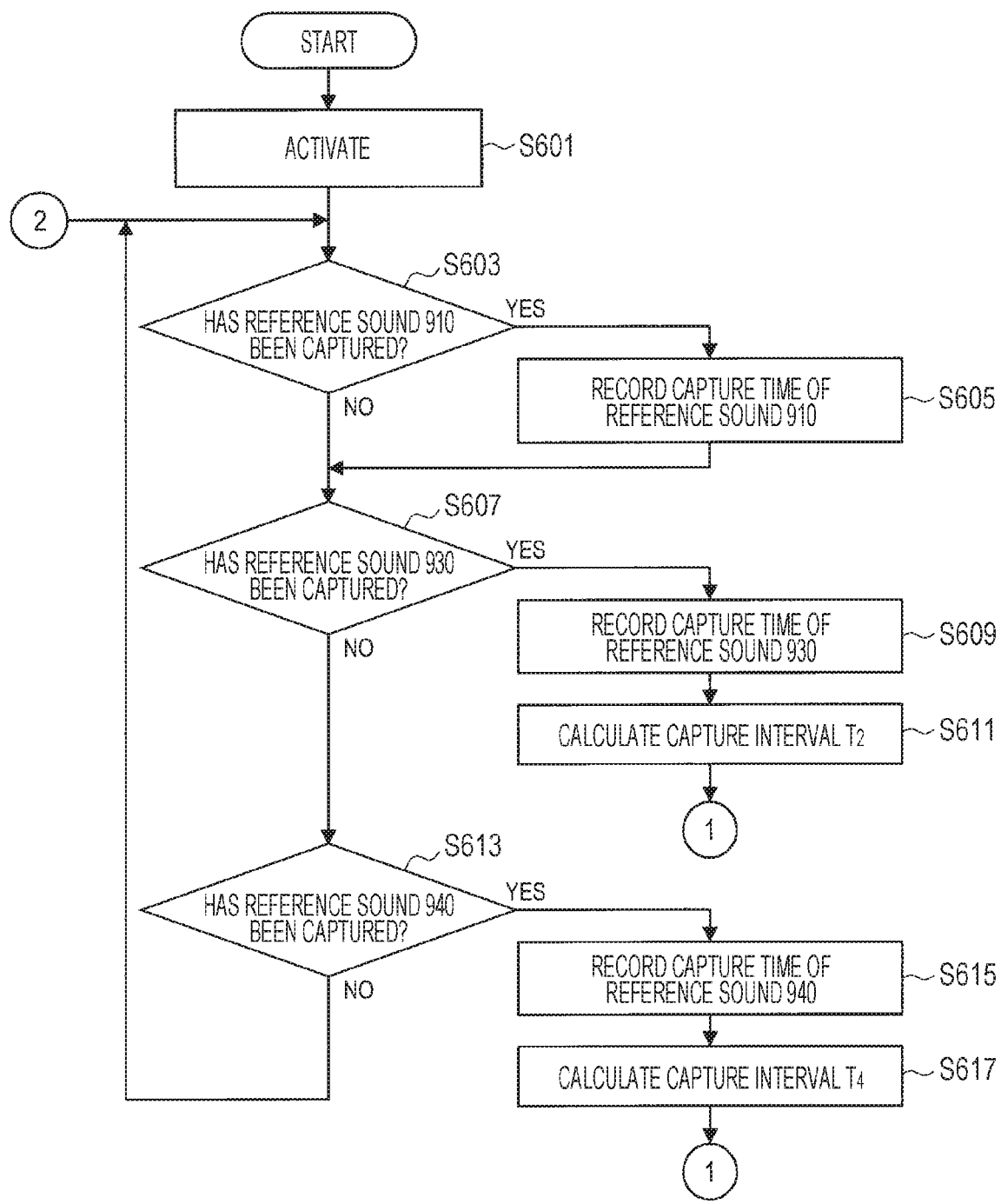
FIG. 12 is a flowchart (part 1) of the imaging device 60 in the imaging method according to the embodiment.
Figure 13:
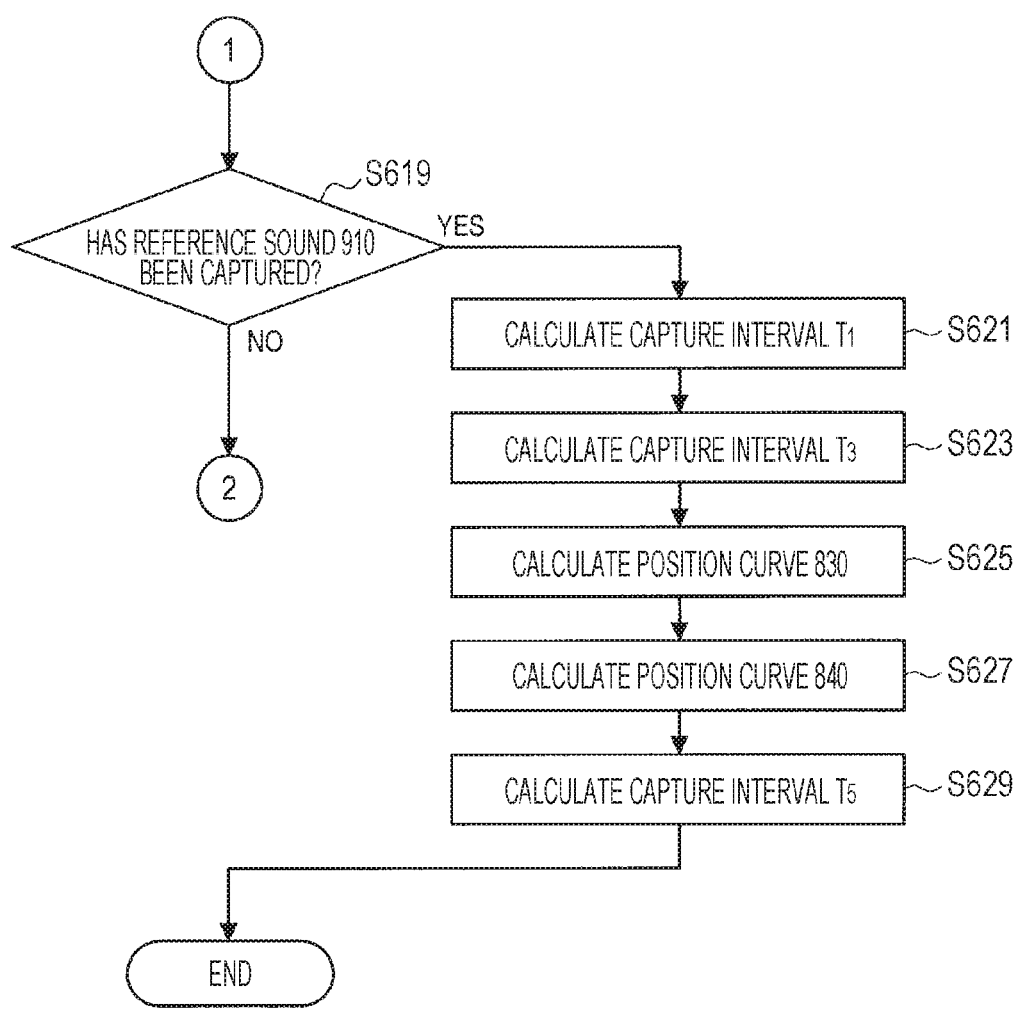
FIG. 13 is a flowchart (part 2) of the imaging device 60 in the imaging method according to the embodiment.

Next, details of the operation of the imaging device 60 will be described with reference to FIGS. 12 and 13. As illustrated in FIGS. 12 and 13, processing of the imaging method in the sound device 10 according to the present embodiment includes a plurality of steps from step S601 to step S629. Hereinafter, an outline of each step will be described.

—Step S601—
The imaging device 60 is activated by the user.
—Step S603—
The imaging device 60 proceeds to step S605 in a case where the imaging device 60 has captured the reference sounds 910 and 912 from the sound device 10, and proceeds to step S607 in a case where the imaging device 60 has not captured the reference sounds 910 and 912.
—Step S605—
The imaging device 60 records the time when the reference sounds 910 and 912 have been captured.
—Step S607—
The imaging device 60 proceeds to step S609 in a case where the imaging device 60 has captured the reference sound 930 from the sound device 30, and proceeds to step S613 in a case where the imaging device 60 has not captured the reference sound 930.
—Step S609—
The imaging device 60 records the time when the reference sound 930 has been captured.
—Step S611—
The imaging device 60 calculates the capture interval $T_2$ on the basis of the time recorded in step S605 and step S609. Next, the imaging device 60 proceeds to step S619.
—Step S613—
The imaging device 60 proceeds to step S615 in a case where the imaging device 60 has captured the reference sound 940 from the sound device 40, and returns to step S603 in a case where the imaging device 60 has not captured the reference sound 940.
—Step S615—
The imaging device 60 records the time when the reference sound 940 has been captured.
—Step S617—
The imaging device 60 calculates the capture interval $T_4$ on the basis of the time recorded in step S605 and step S615. Next, the imaging device 60 proceeds to step S619.
—Step S619—
The imaging device 60 proceeds to step S621 in a case where the imaging device 60 has captured the reference sounds 910 and 912 from the sound device 10, and returns to step S603 in a case where the imaging device 60 has not captured the reference sounds 910 and 912.
—Step S621—
The imaging device 60 records the time when the reference sound 910 has been captured, and calculates the capture interval $T_1$ on the basis of the recorded time and the time recorded in step S605.
—Step S623—
The imaging device 60 records the time when the reference sound 912 has been captured, and calculates the capture interval $T_3$ on the basis of the recorded time and the time recorded in step S615.
—Step S625—
The imaging device 60 calculates the position curve 830 on the basis of the calculation results of steps S611 and S621.
—Step S627—
The imaging device 60 calculates the position curve 840 on the basis of the calculation results of steps S617 and S623.
—Step S629—
The imaging device 60 acquires the position (relative distance) of the imaging device 60 with respect to the sound device 10 on the basis of the calculation results of steps S625 and S627, calculates the delay time 15 on the basis of the acquired position, and corrects the reference sound 910 using the calculated result to generate the synchronization signal. Thereafter, the imaging device 60 terminates the operation.

3. Conclusion

As described above, in the present embodiment, imaging can be synchronized in the plurality of imaging devices 60 using the reference sounds. In particular, according to the present embodiment, synchronization can be performed even underwater where radio waves such as GPS signals cannot be used. Furthermore, since the imaging device 60 is not wired by a communication cable or the like in underwater use, there is no need to route the communication cable underwater. Moreover, the mechanism for waterproofing the imaging device 60 can be simplified.

Furthermore, as described above, to ensure synchronization by the reference sounds, knowing the delay times of capture due to propagation of the reference sounds is required. Therefore, in the present embodiment, knowing the distance between the device (sound device 10) that outputs the reference sounds and the imaging device 60 that captures the reference sounds is required. Therefore, in the present embodiment, the information regarding the mutual relative positional relationship (relative positions) of the three sound devices 10, 30, and 40 is stored in advance in the storage unit 624 of the imaging device 60. According to the present embodiment, the position (relative distance) of the imaging device 60 in the multi-camera system 1 can be obtained using the reference sounds 910, 912, 930, and 940 output from such three sound devices 10, 30, and 40. Moreover, the delay time of capture in the imaging device 60 can be obtained from the position of the imaging device 60. Therefore, according to the present embodiment, since the delay time can be corrected, accurate synchronization can be ensured by the reference sounds. Furthermore, in the present embodiment, in the case where the imaging device 60 is present in the space where the reference sounds output from the sound devices 10, 30, and 40 according to the multi-camera system 1 can be reliably captured, the imaging device 60 can perform synchronization in real time even when the imaging device 60 freely moves. Moreover, according to the present embodiment, the imaging device 60 has the function to capture the reference sounds but does not have the function to output the reference sounds. Therefore, the increase in manufacturing cost and volume of the imaging device 60 can be avoided. Furthermore, even in a case where the number of imaging devices 60 is increased in the multi-camera system 1, it is not necessary to increase the number of the sound devices 10. Therefore, construction of the multi-camera system 1 is easy. Moreover, the present embodiment can be performed only with the three sound devices 10, 30, and 40, in other words, the present embodiment can be performed with four or more reference sounds. Therefore, according to the present embodiment, a problem that sounds cannot be discriminated due to an increase in reference sounds does not occur.

Moreover, the propagation speed (sound speed) of the reference sound is affected by the air temperature, the water temperature, or the like, and changes every moment. However, in the present embodiment, since the propagation speed at the point of time when the reference sounds 910, 912, 930, and 940 have been captured can be obtained in real time, it is not necessary to separately measure the propagation speed.

4. Modification

In the case of using the multi-camera system 1 according to the present embodiment underwater, following use is favorable. The underwater use will be described as a modification 1 according to the present embodiment.

First, it is known that radio waves and the like are immediately attenuated but ultrasonic waves are less easily attenuated underwater. Therefore, the above-described reference sounds are favorably ultrasonic waves in underwater use. Furthermore, as described above, the propagation speed of sound waves is faster and the straightness of sound waves is higher underwater than in the air. Therefore, a relatively large amount of noise caused by reflection of sound waves, reverberation and others is likely to propagate underwater. In other words, the sound device 10 and the like can capture the noise underwater. Therefore, in the present modification, the imaging device 60 is synchronized as follows. Note that, in the present modification described below, it is assumed that the relative positional relationship (relative positions) of the sound devices 10, 30, and 40 is known in advance, similarly to the above-described embodiment.

In detail, in the present modification, first, in the stage where the reference sounds are output as responses to the capture of the reference sounds, the sound devices 10, 30, and 40 output and capture each of the reference sounds in directions toward the sound devices 10, 30, and 40 as counterparts in order to avoid capture of noise. Specifically, each of the sound devices 10, 30, and 40 is provided with a drive unit (not illustrated) that changes the direction of the speakers 106 and 306, and the drive units are controlled to direct the speakers 106 and 306 to the sound devices 10, 30, and 40 as counterparts on the basis of the installation positions of the respective sound devices 10, 30, and 40. Then, the sound devices 10, 30, and 40 output the respective reference sounds with directivity toward the sound devices 10, 30, and 40 as counterparts. Next, in a case where the output and response of the reference sounds 910, 912, 930, and 940 are repeated and an output cycle of each of the reference sounds transitions to a steady state, the respective sound devices 10, 30, and 40 change the direction of the speakers 106 and 306 and the directivity of the reference sounds to output the reference sounds in all directions toward the imaging device 60 located around.

5. Supplement

The imaging method according to the above embodiment may be applied to a multi-camera system (imaging system) 1 that is premised on connection to a server (not illustrated) such as cloud computing. In this case, the processing in the imaging device 60 in the imaging method according to the present embodiment can be performed in the server.

Furthermore, the respective steps in the imaging method according to the above-described embodiment do not necessarily need to be processed in the described order. For example, the respective steps may be processed in an appropriately changed order. Furthermore, the respective steps may be partially processed in parallel or individually processed instead of being chronologically processed. Moreover, the respective steps do not necessarily need to be processed in accordance with the described method, and may be processed by another method using another functional block, for example.

Moreover, at least a part of the measurement method according to the above-described embodiment can be configured by software as an information processing program for causing a computer or the imaging device 60 to function. In the case of configuring at least a part of the measurement method by software, a program that implements at least a part of the method may be stored in a recording medium and read and executed by the imaging device 60 and the like, or by another device connected to the imaging device 60. Furthermore, a program that implements at least a part of the imaging method may be distributed via a communication line (including wireless communication) such as the Internet. Moreover, the program may be distributed via a wired line or a wireless line such as the Internet, or stored in a recording medium, in a state of being encrypted, modulated, or compressed.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1) An imaging system including: three sound devices configured to output reference sounds different from one another; and a plurality of imaging devices configured to perform imaging in synchronization with one another on the basis of the reference sounds, in which each of the sound devices includes a first capture unit configured to capture the reference sound output from another of the sound devices, and an output unit configured to output the corresponding reference sound on the basis of the capture of the reference sound from the another of the sound devices, and each of the imaging devices includes a second capture unit configured to capture each of the reference sounds, a storage unit configured to store information regarding mutual relative positions of the three sound devices, and a synchronization signal generation unit configured to correct any one of the reference sounds on the basis of an interval of capturing each of the reference sounds and the relative positions to generate a synchronization signal for imaging.

(2) The imaging system according to (1), in which the imaging device further includes a position calculation unit configured to calculate a position of the imaging device on the basis of the interval of capturing each of the reference sounds and the relative positions, and the synchronization signal generation unit calculates a delay time of the capture of the reference sound on the basis of the position of the imaging device and corrects the reference sound on the basis of the delay time.

(3) The imaging system according to (1) or (2), in which the imaging device is movable in a region where the reference sound is capturable.

(4) The imaging system according to any one of (1) to (3), in which the respective reference sounds are ultrasonic waves.

(5) The imaging system according to any one of (1) to (4), in which the respective reference sounds are sounds output in a pulse shape, and the respective reference sounds have different frequencies or different pulse intervals from one another.

(6) The imaging system according to (1), in which a first sound device, a second sound device, and a third sound device are included as the three sound devices, the first sound device outputs a first reference sound and a second reference sound different from each other, the second sound device outputs a third reference sound as a response to capture of the first reference sound, and the third sound device outputs a fourth reference sound as a response to capture of the second reference sound.

(7) The imaging system according to (6), in which the imaging device corrects either the first reference sound or the second reference sound on the basis of an interval between a point of time when the first reference sound has been captured and a point of time when the first reference sound has been captured again, an interval between the point of time when the first reference sound has been captured and a point of time when the third reference sound has been captured, an interval between a point of time when the second reference sound has been captured and a point of time when the second reference sound has been captured again, and an interval between the point of time when the second reference sound has been captured and a point of time when the fourth reference sound has been captured.

(8) An imaging device including: a capture unit configured to capture each of reference sounds output from respective three sound devices; a storage unit configured to store information regarding mutual relative positions of the three sound devices; and a synchronization signal generation unit configured to correct any one of the reference sounds on the basis of an interval of capturing each of the reference sounds and the relative positions to generate a synchronization signal for imaging.

(9) An imaging method performed by an imaging device, the imaging method including: capturing each of reference sounds output from respective three sound devices on the basis of capture of a reference sound from another of the sound devices; and correcting any one of the reference sounds on the basis of an interval of capturing each of the reference sounds and information regarding mutual relative positions of the three sound devices to generate a synchronization signal for imaging.

(10) The imaging method according to (9), in which the three sound devices output the corresponding reference sounds toward the another of the sound devices before the capture of each of the reference sounds by the imaging device.

REFERENCE SIGNS LIST

1 Multi-camera system
10, 30, 40 Sound device
60 Imaging device
100a, 100b, 300 Sound generation unit
104 Sound synthesis unit
106, 306 Speaker
108, 308, 608 Microphone
110, 310, 610 Sound reception unit
112, 312, 612 Determination unit
114, 314, 614 Control unit
116, 316, 616 Clock unit
618 Capture interval calculation unit
620 Position calculation unit
622 Synchronization signal generation unit
624 Storage unit
626 Imaging unit
830, 840 Position curve
910, 912, 930, 940 Reference sound

The invention claimed is:

1. An imaging system comprising:
three sound devices configured to output reference sounds different from one another; and
a plurality of imaging devices configured to perform imaging in synchronization with one another on a basis of the reference sounds, wherein
each of the sound devices includes
a first capture unit configured to capture the reference sound output from another of the sound devices, and
an output unit configured to output the corresponding reference sound on a basis of the capture of the reference sound from the another of the sound devices, and
each of the imaging devices includes
a second capture unit configured to capture each of the reference sounds,
a storage unit configured to store information regarding mutual relative positions of the three sound devices, and
a synchronization signal generation unit configured to correct any one of the reference sounds on a basis of an interval of capturing each of the reference sounds and the relative positions to generate a synchronization signal for imaging.

2. The imaging system according to claim 1, wherein the imaging device further includes
a position calculation unit configured to calculate a position of the imaging device on the basis of the interval of capturing each of the reference sounds and the relative positions, and
the synchronization signal generation unit calculates a delay time of the capture of the reference sound on a basis of the position of the imaging device and corrects the reference sound on a basis of the delay time.

3. The imaging system according to claim 1, wherein the imaging device is movable in a region where the reference sound is capturable.

4. The imaging system according to claim 1, wherein the respective reference sounds are ultrasonic waves.

5. The imaging system according to claim 1, wherein the respective reference sounds are sounds output in a pulse shape, and the respective reference sounds have different frequencies or different pulse intervals from one another.

6. The imaging system according to claim 1, wherein
a first sound device, a second sound device, and a third sound device are included as the three sound devices, the first sound device outputs a first reference sound and a second reference sound different from each other, the second sound device outputs a third reference sound as a response to capture of the first reference sound, and the third sound device outputs a fourth reference sound as a response to capture of the second reference sound.

7. The imaging system according to claim 6, wherein
the imaging device corrects either the first reference sound or the second reference sound on a basis of
an interval between a point of time when the first reference sound has been captured and a point of time when the first reference sound has been captured again, an interval between the point of time when the first reference sound has been captured and a point of time when the third reference sound has been captured, an interval between a point of time when the second reference sound has been captured and a point of time when the second reference sound has been captured again, and an interval between the point of time when the second reference sound has been captured and a point of time when the fourth reference sound has been captured.

8. An imaging device comprising:
- a capture unit configured to capture each of reference sounds output from respective three sound devices;
- a storage unit configured to store information regarding mutual relative positions of the three sound devices; and
- a synchronization signal generation unit configured to correct any one of the reference sounds on a basis of an interval of capturing each of the reference sounds and the relative positions to generate a synchronization signal for imaging.

9. An imaging method performed by an imaging device, the imaging method comprising:
- capturing each of reference sounds output from respective three sound devices on a basis of capture of a reference sound from another of the sound devices; and
- correcting any one of the reference sounds on a basis of an interval of capturing each of the reference sounds and information regarding mutual relative positions of the three sound devices to generate a synchronization signal for imaging.

10. The imaging method according to claim 9, wherein the three sound devices output the corresponding reference sounds toward the another of the sound devices before the capture of each of the reference sounds by the imaging device.

* * * * *